United States Patent
Sakurai et al.

(10) Patent No.: US 9,201,498 B2
(45) Date of Patent: Dec. 1, 2015

(54) INFORMATION DISPLAY SYSTEM, INFORMATION DISPLAY APPARATUS AND NON-TRANSITORY STORAGE MEDIUM

(75) Inventors: Keiichi Sakurai, Akishima (JP); Mitsuyasu Nakajima, Mizuho-machi (JP); Takashi Yamaya, Fussa (JP); Yuki Yoshihama, Inagi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 501 days.

(21) Appl. No.: 13/313,334

(22) Filed: Dec. 7, 2011

(65) Prior Publication Data

US 2012/0139941 A1 Jun. 7, 2012

(30) Foreign Application Priority Data

Dec. 7, 2010 (JP) ................................ 2010-272834

(51) Int. Cl.
*G09G 5/00* (2006.01)
*G06F 3/01* (2006.01)
*G06F 1/16* (2006.01)

(52) U.S. Cl.
CPC .............. *G06F 3/011* (2013.01); *G06F 1/1626* (2013.01); *G06F 1/1686* (2013.01); *G06F 1/1694* (2013.01); *G06F 1/1698* (2013.01); *G06F 3/01* (2013.01)

(58) Field of Classification Search
CPC ......... G06F 3/011; G06F 3/01; G06F 1/1698; G06F 17/30244; G06F 9/44505; G06F 17/30289; G06F 17/30339; G06F 17/30498; G06F 17/30424; G06F 11/0766; G06T 19/006; H04B 7/18582
USPC ....................................................... 345/663
See application file for complete search history.

(56) References Cited

U.S. PATENT DOCUMENTS 6,816,868 B1 * 11/2004 Shimizu ................................ 1/1
7,100,195 B1 * 8/2006 Underwood ..................... 726/2
(Continued)

FOREIGN PATENT DOCUMENTS

JP 2001-337885 A 12/2001
JP 10-2006-0004678 A 1/2006
(Continued)

OTHER PUBLICATIONS

MySQL: Insert If Not Exists syntax, Oct. 18, 2007, Internet (http://bogdan.org.ua/2007/10/18/mysql-insert-if-not-exists-syntax.html), p. 1-2.*

(Continued)

*Primary Examiner* — Kee M Tung
*Assistant Examiner* — Yuehan Wang
(74) *Attorney, Agent, or Firm* — Holtz, Holtz, Goodman & Chick PC

(57) ABSTRACT

The matching processor acquires the key information such as position information and/or the like by the key information acquirer, and notifies to an external apparatus via the communicator. The matching processor stores the acquired key information in the storer corresponding to the identification information which is acquired from the external apparatus. When the acquired identification information does not exist in a AR data management table, the matching processor acquires the AR data by notifying the identification information to the external apparatus. When there is no empty record in a key information management table, key information of which usage date and time is old is considered as a deletion target. Moreover, when there is no empty record in the AR data management table, the AR data of which usage date and time is old is considered as the deletion target.

9 Claims, 20 Drawing Sheets

(56) References Cited

U.S. PATENT DOCUMENTS

| | | | |
|---|---|---|---|
| 8,373,725 B2 | 2/2013 | Ryu et al. | |
| 8,761,434 B2 | 6/2014 | Marks et al. | |
| 2005/0035964 A1* | 2/2005 | Heenan | 345/420 |
| 2005/0144189 A1* | 6/2005 | Edwards et al. | 707/102 |
| 2006/0022814 A1 | 2/2006 | Nogami et al. | |
| 2008/0126366 A1 | 5/2008 | Malik et al. | |
| 2009/0171901 A1 | 7/2009 | Bathiche et al. | |
| 2010/0029326 A1 | 2/2010 | Bergstrom et al. | |
| 2011/0034176 A1* | 2/2011 | Lord et al. | 455/450 |
| 2011/0234631 A1* | 9/2011 | Kim et al. | 345/632 |
| 2011/0251903 A1* | 10/2011 | Ryu et al. | 705/14.73 |
| 2012/0140040 A1 | 6/2012 | Sakurai et al. | |
| 2013/0173531 A1 | 7/2013 | Rinearson et al. | |
| 2013/0286048 A1 | 10/2013 | Sternitzke | |
| 2014/0152698 A1 | 6/2014 | Kim et al. | |
| 2014/0233801 A1 | 8/2014 | Cho et al. | |

FOREIGN PATENT DOCUMENTS

| | | | |
|---|---|---|---|
| JP | 2006-040035 A | 2/2006 | |
| JP | 2006-094082 A | 4/2006 | |
| JP | 2006-261995 A | 9/2006 | |
| JP | 2007-174548 A | 7/2007 | |
| JP | 2008-510254 A | 4/2008 | |
| JP | 2009-230255 A | 10/2009 | |
| JP | 2010-231741 A | 10/2010 | |
| JP | 2010-238098 A | 10/2010 | |
| KR | 100989663 B1 | 10/2010 | |

OTHER PUBLICATIONS

Japanese Office Action dated Sep. 25, 2012 (and English translation thereof) in counterpart Japanese Application No. 2010-272834.
U.S. Appl. No. 13/313,279; First Named Inventor: Keiichi Sakurai; Title: "Information Display System, Information Display Apparatus, Information Provision Apparatus and Non-Transitory Storage Medium"; Filed: Dec. 7, 2011.
Chinese Office Action dated Dec. 30, 2013 (and English translation thereof) in counterpart Chinese Application No. 201110397600.2.
Chinese Office Action (and English translation) dated Apr. 2, 2013, which issued in Chinese Application No. 201110396902.8, which is a counterpart application of U.S. Appl. No. 13/313,279.
Japanese Office Action dated Feb. 25, 2014 (and English translation thereof) in counterpart Japanese Application No. 2013-018665.

* cited by examiner

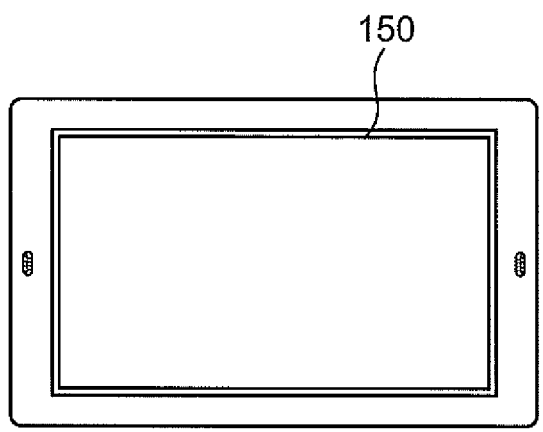
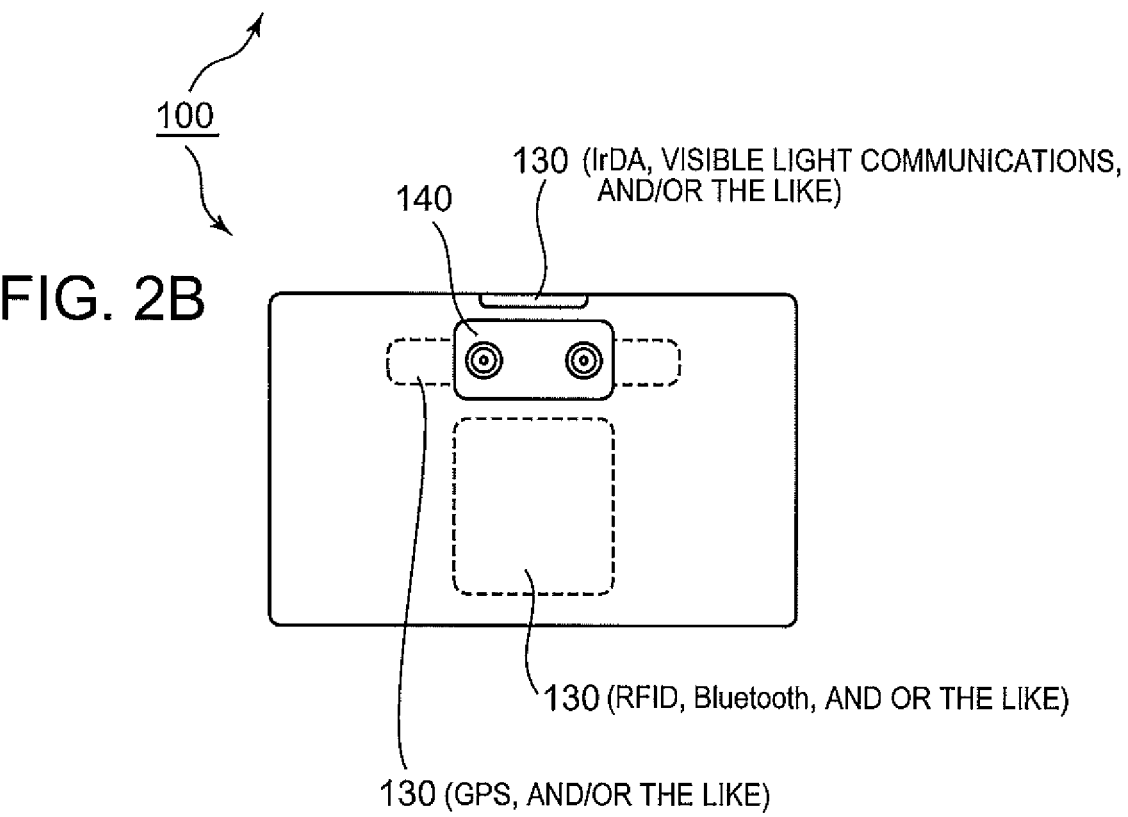

FIG. 7

| POSITION INFORMATION | REFERENCE IMAGE | SCALE INFORMATION | UNIT SCALE | SUPERIMPOSING INFORMATION | ⋯ |
|---|---|---|---|---|---|
| ⋯ | ⋯ | ⋯ | ⋯ | ⋯ | ⋯ |
| N***, E*** | 77aa.jpg | IMAGE SIZE, SENSOR SIZE, DISTANCE TO SUBJECT, FOCAL LENGTH, ANGLE OF VIEW, ⋯ | $7 \times 10^2$mm | THIS IS STORE A. ⋯ | ⋯ |
|  | 77ab.jpg | IMAGE SIZE, SENSOR SIZE, DISTANCE TO SUBJECT, FOCAL LENGTH, ANGLE OF VIEW, ⋯ | $7 \times 10^{-1}$mm | PRODUCT NAME "TABLE", ⋯ | ⋯ |
|  | ⋯ | ⋯ | ⋯ | ⋯ | ⋯ |
|  | 77az.jpg | IMAGE SIZE, SENSOR SIZE, DISTANCE TO SUBJECT, FOCAL LENGTH, ANGLE OF VIEW, ⋯ | $7 \times 10^{-1}$mm | PRODUCT NAME "PEN", ⋯ | ⋯ |
| ⋯ | ⋯ | ⋯ | ⋯ | ⋯ | ⋯ |
| N***, E*** | 773.jpg | IMAGE SIZE, SENSOR SIZE, DISTANCE TO SUBJECT, FOCAL LENGTH, ANGLE OF VIEW, ⋯ | $7 \times 10^2$mm | CC BUILDING | ⋯ |
| ⋯ | ⋯ | ⋯ | ⋯ | ⋯ | ⋯ |

REFERENCE IMAGE STORING TABLE

FIG. 10A
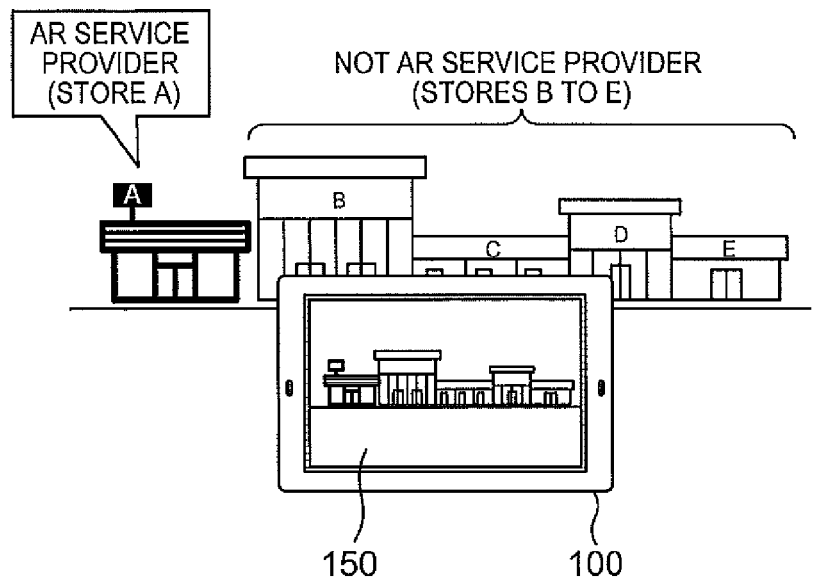
FIG. 10B
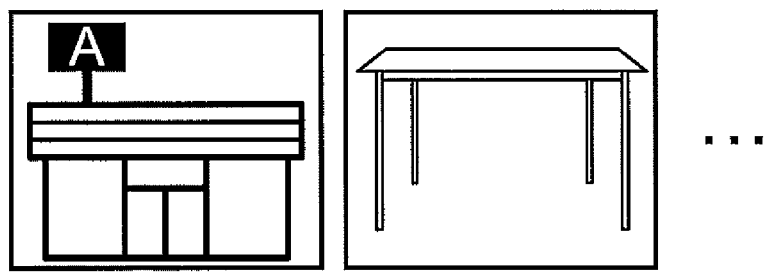
REFERENCE IMAGE AA
STORE APPEARANCE
UNIT SCALE: 7×10 mm
REFERENCE IMAGE AB
PRODUCT (TABLE)
UNIT SCALE: 7 mm
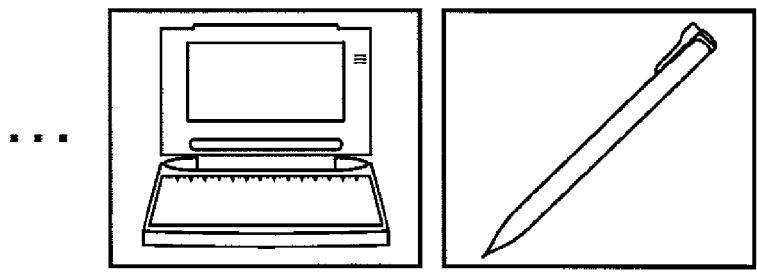
REFERENCE IMAGE AY
PRODUCT (LAPTOP PC)
UNIT SCALE: $7 \times 10^{-1}$ mm
REFERENCE IMAGE AZ
PRODUCT (PEN)
UNIT SCALE: $7 \times 10^{-2}$ mm

| GROUP ID | POSITION INFORMATION | AR DATA ||||||
|---|---|---|---|---|---|---|---|
| | | IDENTIFICATION INFORMATION | REFERENCE IMAGE | SCALE INFORMATION | UNIT SCALE | SUPERIMPOSING INFORMATION | |
| ... | ... | ... | ... | ... | ... | ... | ... |
| A000077 | N***  E*** | ref11170 | 77aa.jpg | IMAGE SIZE, ... | $7 \times 10^2$ mm | THIS IS STORE A, ... | ... |
| | | ref11171 | 77ab.jpg | IMAGE SIZE, ... | $7 \times 10^{-1}$ mm | PRODUCT NAME "TABLE", ... | ... |
| | | ... | ... | ... | ... | ... | ... |
| | | ref22077 | 77az.jpg | IMAGE SIZE, ... | $7 \times 10^{-1}$ mm | PRODUCT NAME "PEN", ... | ... |
| ... | ... | ... | ... | ... | ... | ... | ... |
| — | N***, E*** | ref77777 | 773.jpg | IMAGE SIZE, ... | $7 \times 10^2$ mm | CC BUILDING | ... |
| ... | ... | ... | ... | ... | ... | ... | ... |

REFERENCE IMAGE STORING TABLE

FIG. 18A

| RECORD No. | KEY INFORMATION | ACQUISITION METHOD | USAGE DATE AND TIME | AR DATA IDENTIFICATION INFORMATION | EXCLUSION FLAG |
|---|---|---|---|---|---|
| 1 | (POSITION INFORMATION) | GPS | 2010 07 07 17:17 | ref11170, ref11171 ... | |
| 2 | (GROUP ID) | VISIBLE LIGHT COMMUNICATIONS | 2010 07 07 17:18 | ref11170, ref11171 ... | ● |
| 3 | (IDENTIFICATION INFORMATION) | RFID | 2010 07 07 17:18 | ref11171 | |
| ... | ... | ... | ... | ... | ... |
| n | (POSITION INFORMATION) | VISIBLE LIGHT COMMUNICATIONS | 2010 07 27 19:37 | ref33377 | |

KEY INFORMATION MANAGEMENT TABLE

FIG. 18B

| RECORD No. | IDENTIFICATION INFORMATION | AR DATA | USAGE DATE AND TIME |
|---|---|---|---|
| 1 | ref11170 | REFERENCE IMAGE, SUPERIMPOSING INFORMATION, SCALE INFORMATION, ... | 2010 07 07 17:17 |
| 2 | ref11171 | REFERENCE IMAGE, SUPERIMPOSING INFORMATION, SCALE INFORMATION, ... | 2010 07 07 17:18 |
| ... | ... | ... | ... |
| m | ref77777 | REFERENCE IMAGE, SUPERIMPOSING INFORMATION, SCALE INFORMATION, ... | 2010 09 27 07:27 |

AR DATA MANAGEMENT TABLE

CURRENT LINE OF SIGHT FOR CAMERA

LINE OF SIGHT FOR REFERENCE IMAGE

REFERENCE IMAGE

MATCHING DIFFICULT

3D MODELING DATA

MATCHING POSSIBLE

LINE OF SIGHT FOR 3D MODELING DATA CHANGED TO LINE OF SIGHT FOR REFERENCE IMAGE

INFORMATION DISPLAY SYSTEM, INFORMATION DISPLAY APPARATUS AND NON-TRANSITORY STORAGE MEDIUM

CROSS-REFERENCE TO RELATED APPLICATION

This application claims the benefit of Japanese Patent Application No. 2010-272834, filed on Dec. 7, 2010, the entire disclosure of which is incorporated by reference herein.

FIELD

This application relates generally to an information display system, an information display apparatus and a non-transitory storage medium, and more particularly, to the information display system, the information display apparatus and the non-transitory storage medium suitable for information display using AR technology.

BACKGROUND

A high-performance portable communication terminal provided with an imaging function, such as so-called smartphone, is becoming popular and, a service (hereinafter referred to as "AR service") which is applied the AR (Augmented Reality) technology to such terminal device is realized. In the AR service, since additional information is superimposed on the photographed image captured by the terminal in real time, various information may be easily obtained in a place of picking up, as National Patent Publication No. 2008-510254, for example.

In a case of superimposing information on the captured image and in a case where there are a plurality of subjects in the image, it is required a position alignment for correctly associating the information to be superimposed and each subject. As one method of the position alignment, for example, Unexamined Japanese Patent Application KOKAI Publication No. 2009-230255 discloses that the subject is specified by performing image recognition on the captured image and applying matching with various captured images accumulated in a server or a database on a network.

According to this method, various things become the targets of the AR service and, the number of times of inquiry to a server increases as the AR service is better. Moreover, a huge amount of reference images will be accumulated in a database and, the quantity of the information provided in response to the inquiry also increases, thus, network traffic load will be increased.

Moreover, in a terminal which uses the provided information, since the quantity of acquired information also increases memory usage increases and, it takes time for the matching due to increasing the number of matching objects. As a result, the performance at the time of using the AR service would be declined, and convenience would be decreased.

The present disclosure is made in view of the above mentioned actual condition, and an object of the present disclosure is to provide an information display system, an information display apparatus and a non-transitory storage medium which can improve the convenience in the AR service.

SUMMARY

According to a first aspect of the present disclosure, an information display system for displaying information comprising:

an information display apparatus which includes an imaging unit; and
an information provision apparatus;
wherein the information display apparatus comprises:
a key information acquiring unit which acquires key information corresponding to a subject in a captured image captured by the imaging unit; and
a key information notifying unit which notifies the key information to the information provision apparatus,
wherein the information provision apparatus comprises:
an AR data storage unit which stores augmented reality (AR) data corresponding to identification information for identifying the AR data and key information notified by the key information notifying unit, the AR data including (i) a reference image including a reference subject, and (ii) superimposing information corresponding to the reference image; and
an information providing unit (i) which transmits the identification information corresponding to the key information to the information display apparatus when the key information is provided from the information display apparatus, and (ii) which transmits the AR data corresponding to the identification information to the information display apparatus when the identification information is provided from the information display apparatus,
wherein the information display apparatus further comprises:
an identification information acquiring unit which acquires the identification information provided from the information provision apparatus in accordance with a notification of the key information;
a key information recording unit which records the corresponding the key information and the identification information in a first table defined by the number of records;
an identification information notifying unit which notifies the identification information recorded in the first table to the information provision apparatus;
an AR data acquiring unit which acquires the AR data provided from the information provision apparatus in accordance with a notification of the identification information;
an AR data recording unit which records acquired AR data corresponding to the first table in a second table defined by the number of records; and
an AR data displaying unit which superimposes and displays the superimposing information corresponding to the reference image on the captured image based on a result from matching the subject in the captured image with the reference image included in the AR data which is recorded by the AR data recording unit.

According to a second aspect of the present disclosure, an information display apparatus comprising:
an imaging unit;
a communication unit which communicates with an external apparatus;
a displaying unit;
a key information acquiring unit which acquires key information corresponding to a subject in a captured image captured by the imaging unit;
a key information notifying unit which notifies the key information acquired by the key information acquiring unit to the external apparatus through a communication network;
an identification information acquiring unit which acquires the identification information indicating augmented reality (AR) data transmitted by the external apparatus in accordance with a notification of the key information by the key information notifying unit through the communication network, the AR data including (i) a reference image including a reference subject, and (ii) superimposing information corresponding to the reference image;

a key information recording unit which records the key information acquired by the key information acquiring unit corresponding to a usage date and time of the key information and identification information acquired by the identification information acquiring unit in a first table defined the number of records;

an identification information notifying unit which notifies the identification information recorded in the first table to the external apparatus through the communication network;

an AR data acquiring unit which acquires the AR data transmitted by the external apparatus in accordance with a notification of the identification information by the identification information notifying unit; and an AR data recording unit which records the AR data acquired by the AR data acquiring unit, which corresponds to notified identification information and the usage date and time of the AR data, in a second table defined by the number of records;

wherein the displaying unit has
an AR data displaying unit which superimposes and displays the superimposing information corresponding to the reference image on the captured image based on a result from matching the subject in the captured image with the reference image included in the AR data which is recorded in the second table,
wherein
the identification information notifying unit notifies the identification information to the external apparatus when the identification information recorded in the first table is not recorded in the second table;

the key information recording unit executes a deletion based on the usage date and time of the key information already recorded, when no empty record is present in the first table at the time the key information acquiring unit acquires the key information; and the AR data recording unit executes a deletion based on the usage date and time of the AR data already recorded, when no empty record is present in the second table at the time the identification information notifying unit notifies the identification information.

According to a third aspect of the present disclosure, a non-transitory computer-readable storage medium which stores a program for causing a computer of an information display apparatus including an imaging unit, a communicating unit which communicates with an external apparatus and a displaying unit to perform functions comprising:

acquiring key information corresponding to a subject in a captured image captured by the imaging unit;

notifying the key information to the external apparatus through a communication network;

acquiring the identification information indicating augmented reality (AR) data transmitted by the external apparatus in accordance with a notification of the key information through the communication network, the AR data including (i) a reference image including a reference subject and (ii) superimposing information corresponding to the reference image;

recording acquired key information corresponding to a usage date and time of the key information and acquired identification information in a first table defined by the number of records;

notifying the identification information to the external apparatus through the communication network when the identification information recorded in the first table is not recorded in a second table recording the corresponding the identification information and the AR data acquired from the external apparatus;

acquiring the AR data transmitted by the external apparatus in accordance with a notification of the identification information;

recording acquired AR data corresponding to notified identification information and the usage date and time of the AR data in the second table defined by the number of records;

superimposing and displaying the superimposing information on the captured image on the displaying unit using the AR data recorded in the second table;

executing a deletion based on the usage date and time of the key information having already recorded, when no empty record is present in the first table at the time the key information is acquired; and executing a deletion based on the usage date and time of the AR data having already recorded, when no empty record is present in the second table at the time notifying the identification information to the external apparatus.

According to the present disclosure, it is possible to improve the convenience at the time of utilizing a service using the AR technology.

The above and further objects and novel features of the present disclosure will more fully appear from the following detailed description when the same is read in conjunction with the accompanying drawings. It is to be expressly understood, however, that the drawings are for the purpose of illustration only and are not intended as a definition of the limits of the disclosure.

BRIEF DESCRIPTION OF THE DRAWINGS

A more complete understanding of this application can be obtained when the following detailed description is considered with reference to the following drawings, in which:

FIGS. 2A and 2B are schematic diagrams showing configuration of external appearance of the information display apparatus shown in FIG. 1, FIG. 2A shows the configuration of external appearance on a main surface side and, FIG. 2B shows the configuration of external appearance on a back surface side;

FIG. 7 is a diagram showing an example of a "reference image storing table" which is registered in the storer shown in FIG. 5;

FIGS. 10A and 10B are diagrams for explaining an operation concerning the first embodiment of the present disclosure, FIG. 10A shows an example of a scene assumed, and FIG. 10B shows examples of reference images to be used;

FIG. 11A shows the example of a distribution display, and FIG. 11B shows the example which displays a guide on the distribution display;

FIG. 12A shows a display example in a case where the guide moves, and FIG. 12B shows the example of displaying superimposing information;

FIG. 13A shows the example of the guide display which induces an approach to a subject, FIG. 13B shows the example of the guide display which induces a separation from the subject, and FIG. 13C shows the example of the guide display which shows a required angle of view;

FIG. 15 is a diagram showing an example of a "reference image storing table" of the second embodiment in the present disclosure;

FIGS. 18A and 18B are diagrams for explaining a table used in the "AR display process (2)" shown in FIG. 14, FIG. 18A shows an example of a "key information management table", and FIG. 18B shows an example of the "AR data management table";

FIG. 20B shows an example of the reference image, FIG. 20C shows an example of generated 3D modeling data, and FIG. 20D shows an example of 3D modeling data after changing the line of sight.

DETAILED DESCRIPTION

The embodiments of the present disclosure will be described below with reference to drawings.

First Embodiment

Figure 1:
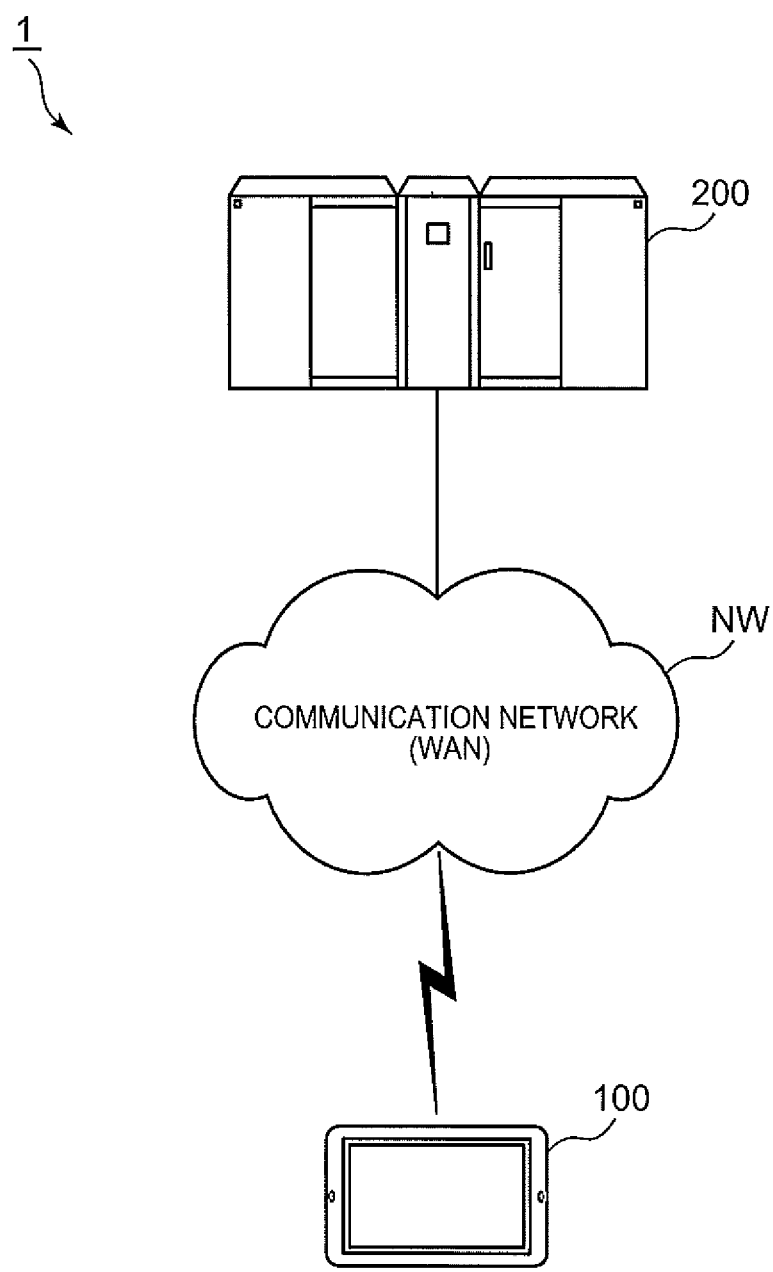
FIG. 1 is a schematic diagram showing an information display system concerning embodiments of the present disclosure.

An information display system 1 of the embodiment of the present disclosure will be described with reference to FIG. 1. FIG. 1 is a schematic diagram showing a configuration of the information display system 1 of the embodiment.

As shown in the Figure, the information display system 1 of this embodiment has an information display apparatus 100 and an information provision apparatus 200, and/or the like, which are connected by a communication network NW.

The communication network NW in this embodiment is WAN (Wide Area Network) including IP network such as Internet and a cellular network for mobile communications, for example.

The information display apparatus 100 in this embodiment is a portable terminal device having at least a communication function, an imaging function and a displaying function, and so-called smartphone is preferred for the information display apparatus 100. In this embodiment, the information display apparatus 100 is the smartphone as shown in FIG. 1. In this embodiment, a service which is applied an AR (Augmented Reality) technology (hereinafter, referred to as "AR service") is realized by the information display system 1 including the information display apparatus 100. Specifically, on a captured image which is shot by the imaging function of the information display apparatus 100, information relating to a subject in the image is displayed superimposing in real time.

Figure 3:
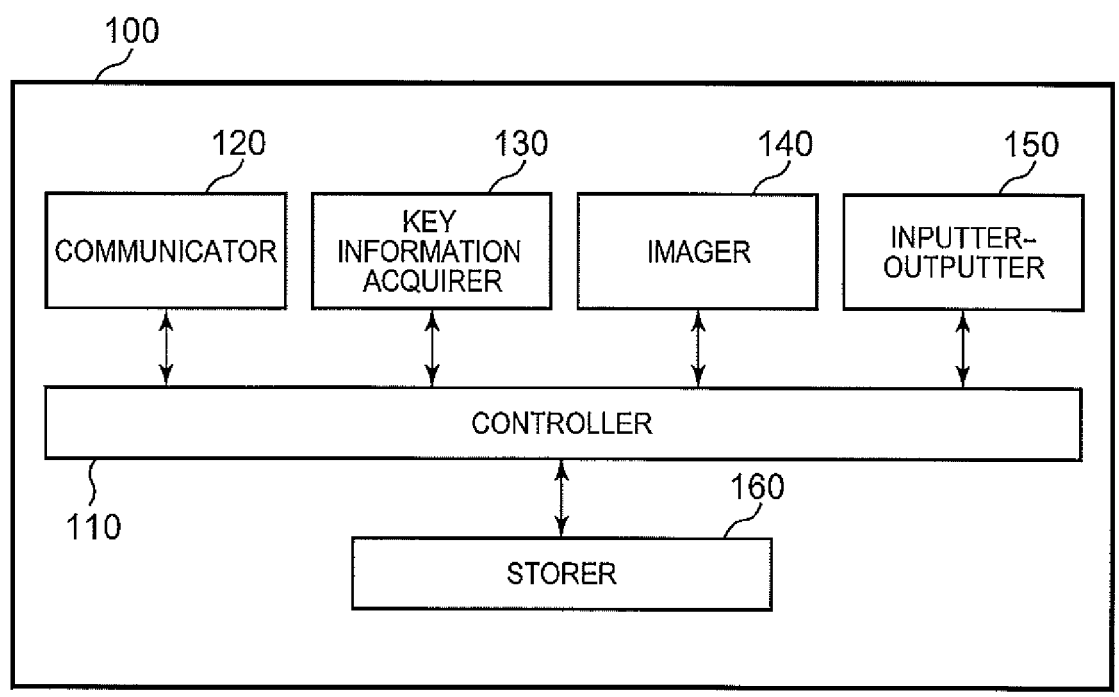
FIG. 3 is a block diagram showing a configuration of the information display apparatus shown in FIG. 1.

A configuration of the information display apparatus 100 will be described with reference to FIG. 2 and FIG. 3. FIG. 2 is a schematic diagram showing a configuration of external appearance of the information display apparatus 100. FIG. 2A shows a main surface side of the information display apparatus 100 and, FIG. 2B shows a back surface side of the information display apparatus 100. Moreover, FIG. 3 is a block diagram showing a configuration of the information display apparatus 100.

As shown in each of above-mentioned Figures, the information display apparatus 100 in this embodiment has a controller 110, a communicator 120, a key information acquirer 130, an imager 140, an inputter-outputter 150, and a storer 160, and/or the like.

The controller 110 has a CPU (Central Processing Unit), a RAM (Random Access Memory), and/or the like. The controller 110 controls each section of the information display apparatus 100 and performs each process described later by executing a program.

The communicator 120 is a component for realizing a communication through the communication network NW. For example, The communicator 120 is configured by a communication module which can directly access the WAN such as a cellular communication module for CDMA 2000 scheme and a communication module for IEEE 802.16e (namely, mobile WiMAX) and/or, a communication module for IEEE 802.11 series (wireless LAN) to communicate with an access point of the public wireless LAN and an external communication device (a mobile router, and/or the like) which can access the WAN.

The key information acquirer 130 is a component for acquiring key information which is required when using the AR service. For example, the key information acquirer 130 is configured by a GPS (Global Positioning System) module, a short range wireless communication module such as RFID (Radio Frequency Identification), IrDA (Infrared Data Association) and Bluetooth (trademark) and, a visible light communication module. The key information acquirer 130 acquires the key information provided from outside.

The "key information" here includes, for example, position information (latitude and longitude information) which shows a current position of the information display apparatus 100, in addition, ID information provided to various facilities such as stores which register information to be superimposed by the AR service in the information provision apparatus 200, and/or the like. The information display apparatus 100 transmits the key information acquired to the information provision apparatus 200, thereby selecting a reference image which is needed to positioning and information to be provided in the AR service.

Therefore, the GPS module, and/or the like, is used as the component for acquiring the current position information of the information display apparatus 100. In addition, the short range wireless communication module, the visible light communication module, and/or the like, are used as the component for acquiring the ID information acquirable at the various facilities, and/or the like. These components are suitably configured on the external surface of the information display apparatus 100 and the inside thereof, for example, as shown in FIG. 2B. However, the information diplay apprataus 100 need not have all these components. The information display apparatus 100 has at least the component for acquiring position information (a GPS module, and/or the like) in this embodiment.

In this embodiment, the key information acquirer 130 includes at least the component for acquiring the current position (a GPS module, and/or the like) and, the component for acquiring the ID information is arbitrarily included. Moreover, the key information acquirer 130 may acquire the position information by a method other than the GPS, for example, the key information acquirer 130 may acquire the position information from a base station accessed in a cellular communication or an access point accessed in wireless LAN. In this case, the key information acquirer 130 includes the communicator 120 to perform these communications.

The imager 140 is a component for realizing the imaging function of the information display apparatus 100 and, is configured by a digital camera module using a solid-state image sensing device, for example. In this embodiment, the information provided by the AR service is superimposed on the moving image (photographed image) as live view image obtained by the imager 140.

In addition, in a case where the above mentioned key information is provided as visual objects such as a two dimensional code like QR Code (trademark) for example, the key information is acquired by an imaging operation of the imager 140. In this case, the key information acquirer 130 includes the imager 140.

Moreover, as the imager 140, a two lenses type stereo camera as shown in FIG. 2B is preferred. Specifically, the imager 140 is an imaging device which has two lenses arranged in horizontal direction in parallel at an interval corresponding to parallax. Adapting such stereo camera enables to perform a ranging to the subject according to the principle of triangulation and to generate 3D modeling data.

The inputter-outputter 150 includes, at least a display device which displays and output captured image by the imager 140 and information provided by the AR service and, an input device which receives input operations by a user of the information display apparatus 100. In this embodiment, a touch panel (touch screen) which integrally realizes the display function and the input function is configured as the inputter-outputter 150. Moreover, the inputter-outputter 150 also includes a speaker and a microphone which are used for voice input and output in a telephone call function in the smartphone.

The storer 160 is configured, for example, by a semiconductor memory device such as a flash memory and, the storer 160 stores programs to be executed by the controller 110, data to be used in various process, data generated in the various process and data acquired by operation of the communicator 120 and the key information acquirer 130, and/or the like.

Figure 4:
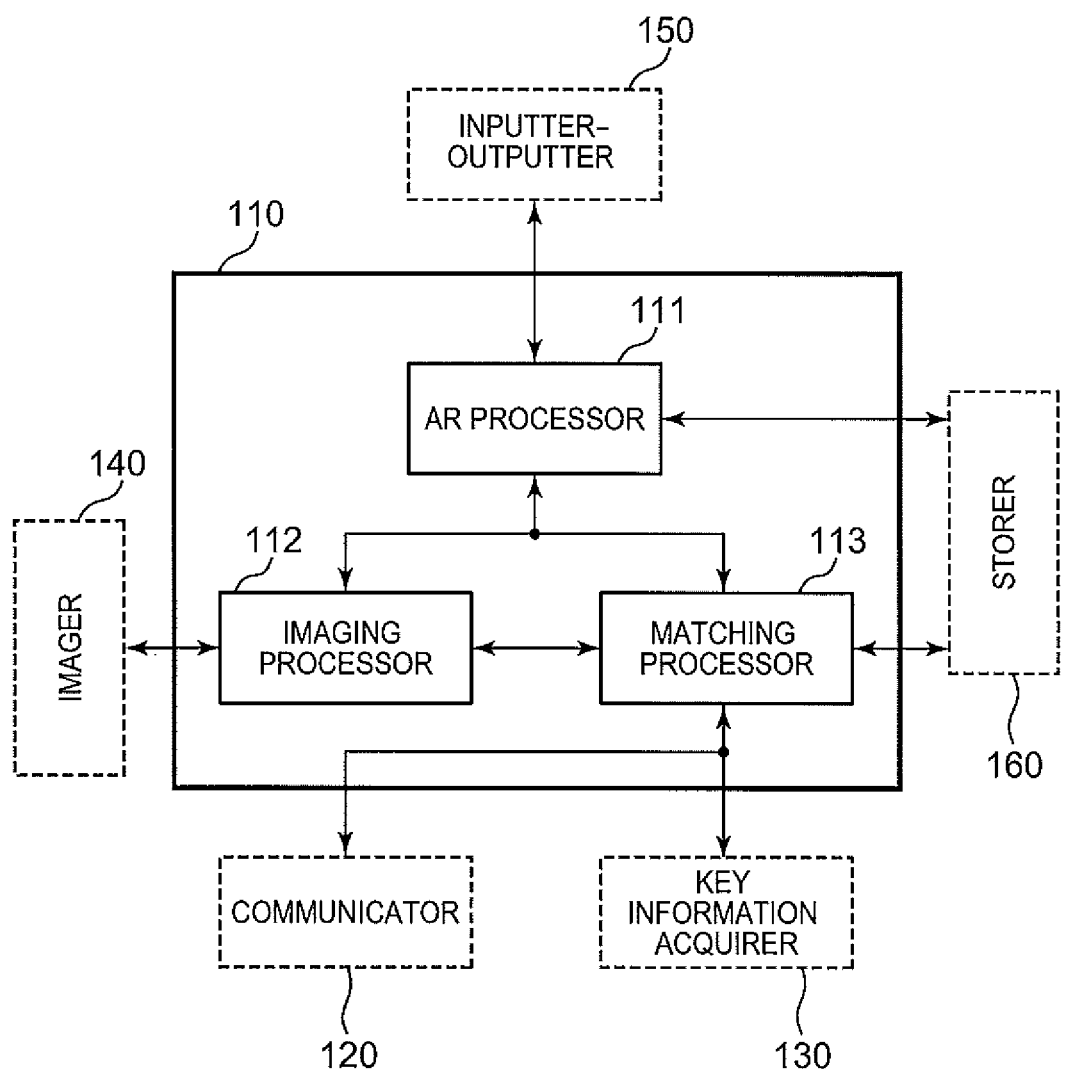
FIG. 4 is a functional block diagram showing functions which are realized by the controller shown in FIG. 3.

Functions which are realized by executing programs stored in the storer 160 by the controller 110 will be described with reference to FIG. 4. FIG. 4 is a functional block diagram showing functions which are realized by the controller 110.

In this embodiment, as shown in the Figure, functions of the AR processor 111, the imaging processor 112, and the matching processor 113, and/or the like, are realized by the controller 110.

The AR processor 111 performs an application (hereinafter, referred to as "AR application") which relates to the AR service and is stored in the storer 160, based on an input signal from the inputter-outputter 150 according to user's operation, and/or the like, and controls the operation thereof. The AR processor 111 performs image processing which is required for a display operation (hereinafter, referred to as "AR display") concerning the AR service, and displays on or output to the inputter-outputter 150. In this case, the AR display is performed by performing the image processing using the capture data, and/or the like, which is stored in the storer 160.

The imaging processor 112 controls the imager 140 to control an operation relating to the imaging function of the information display apparatus 100. In this embodiment, the imaging processor 112 controls the imaging operation which is required for the AR application performed by the AR processor 111.

The matching processor 113 controls the communicator 120 and the key information acquirer 130 and acquires information from the information provision apparatus 200 or various external devices, thereby performing a matching operation which is required for the alignment in the AR display. The key information acquirer 130 is controlled so as to acquire the key information in accordance with an execution of the AR application and, to store the acquired key information in the storer 160. Moreover, the communicator 120 is controlled so as to transmit the acquired key information to the information provision apparatus 200, and/or the like, and to acquire the reference image and superimposing information which are required for execution of the AR application from the information provision apparatus 200. Then, the matching processor 113 stores the reference image and superimposing information which are acquired in the storer 160, and compares the captured image acquired by the imaging processor 112 and the reference image.

Although these functions are logically realized by the controller 110 in this embodiment, a part of or all of these functions may be realized by hardware, such as ASIC (Application Specific Integrated Circuit), for example.

Each component of the information display apparatus 100 described above is one required to realize the present disclosure and, the other components required to function as the smartphone are arbitrarily provided.

Figure 5:
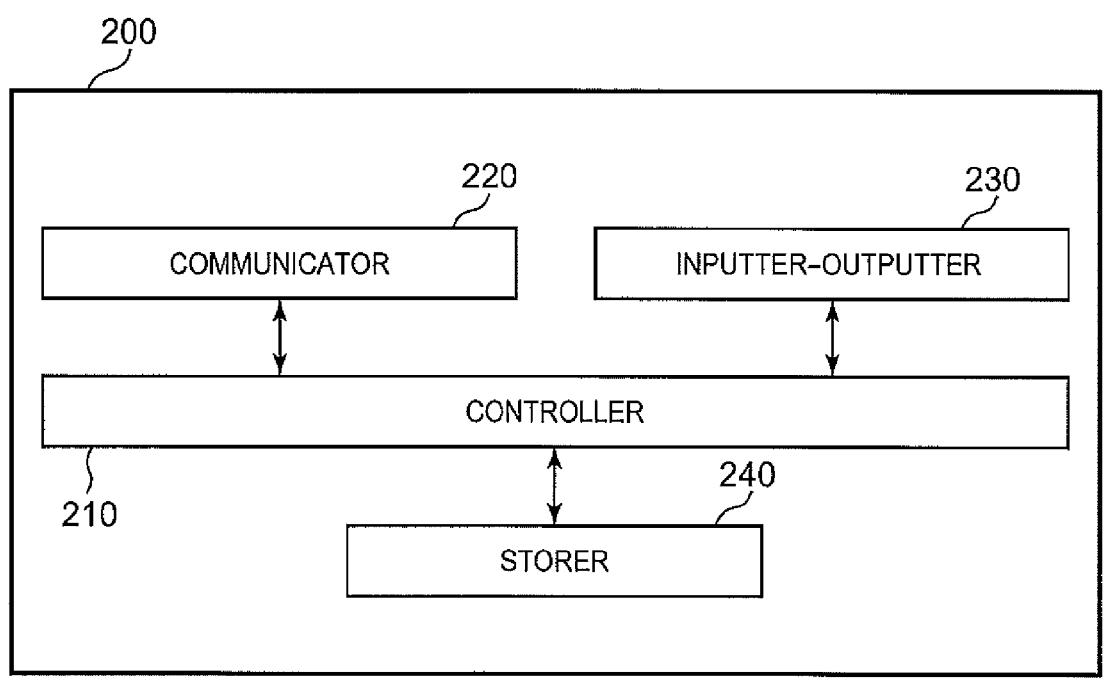
FIG. 5 is a block diagram showing a configuration of the information provision apparatus shown in FIG. 1.

Next, the configuration of the information provision apparatus 200 will be explained. The information provision apparatus 200 is, for example, an information processing apparatus such as an ASP (Application Service Provider) server, and provides the AR service to the information display apparatus 100 connected through the communication network NW in this embodiment. The configuration of such information provision apparatus 200 will be described with reference to FIG. 5. FIG. 5 is a block diagram showing the configuration of the information provision apparatus 200.

As shown in the Figure, the information provision apparatus 200 has a controller 210, a communicator 220, an inputter-outputter 230, a storer 240, and/or the like.

The controller 210 has a CPU, a RAM, and/or the like. The controller 210 controls each section of the information provision apparatus 200 and performs each process described later by executing a program.

The communicator 220 is a component for communicating through the communication network NW. For example, the communicator 220 is configured by a device for communication such as a NIC (Network Interface Card), a router, a modem and/or the like, and performs data transmission and reception using a suitable communication protocol.

The inputter-outputter 230 is configured by an input device such as a keyboard and a mouse, which performs an input according to operation by the operator of the information provision apparatus 200, and an output device such as a display device, which outputs process results.

The storer 240 is configured by a storage device such as a hard disk drive, and/or the like. The storer 240 stores the program which the controller 210 executes. In addition, the storer 240 stores data required for each process performed by execution of the program and data generated by the processes.

Figure 6:
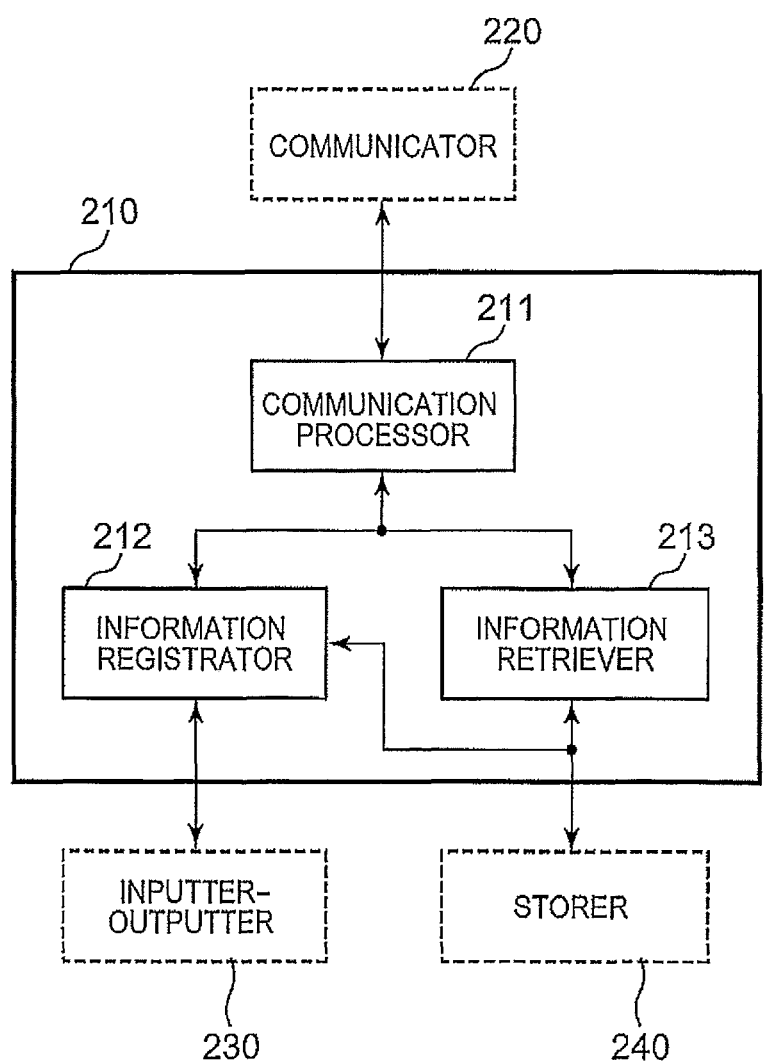
FIG. 6 is a functional block diagram showing functions which are realized by the controller shown in FIG. 5.

Functions which are realized by executing programs stored in the storer 240 by the controller 210 will be described with reference to FIG. 6. FIG. 6 is a functional block diagram showing functions which are realized by the controller 210.

In this embodiment, as shown in the Figure, functions of the communication processor 211, the information registrator 212, the information retriever 213, and/or the like, are realized by the controller 210.

The communication processor 211 controls the communicator 220 and, communicates with the information display apparatus 100 through the communication network NW. In this embodiment, the communication processor 211 receives the key information transmitted from the information display apparatus 100 and, transmits the information retrieved by the information retriever 213 mentioned later to the information display apparatus 100.

The information registrator 212 performs a process for registering information required for providing the AR service into the storer 240. FIG. 7 is an example of information registered in the storer 240. In this embodiment, a "reference image storing table" shown in the Figure is generated in the storer 240 and, various kinds of information required for providing the AR service are stored therein.

In the reference image storing table, information (hereinafter, referred to as "index information") which is index of each reference image, information (hereinafter, referred to as "superimposing information") for being superimposed and displayed on the captured image corresponding to the subject specified by the reference image, and/or the like, are stored in correspondence with a plurality of reference images prepared in order to apply the matching with the subject taken in the captured image which the information display apparatus 100 using the AR service has image.

The "reference image" in this embodiment is an image in which the object relating to the information which is superimposed on the captured image by the AR service is captured as the subject. For example, an image having the exterior of some building such as a store as the subject or an image having a product such as commercial product as a subject is registered as the reference image.

The index information data caused to correspond with such reference image is position information (latitude and longitude information), and/or the like, which shows a position where the subject concerned exists, for example. These pieces of information may be obtained as additional information of Exif (Exchangeable Image File Format), and/or the like, by applying the captured image taken by the imaging device provided with the GPS function as the reference image, for example. In addition, these pieces of information may be input by the operation in which the operator of the information provision apparatus 200 operates the inputter-outputter 230, when registering into the storer 240.

Other than the index information, "scale information" and "unit scale" as shown in FIG. 7 are recorded in the reference image storing table.

The scale information is to be used for specifying a scale of the subject among shot data concerning the reference image. An image size (the number of pixels) of the image concerned, a size of imaging elements (sensor size), distance to the subject, a focal length of a lens, and/or the like, are recorded as the scale information. These pieces of information may be recorded by being acquired from the additional information of the Exif data relating to the reference image, and/or the like, or by an input by the operator's operation, and/or the like.

Moreover, the scale information also includes information which shows an angle of view. The angle of view is calculated from the above mentioned scale information and is recorded. In this case, for example, the angle of view [degree] is obtained by calculating the mathematical formula 1.

$$2 \times \tan^{-1}\{\text{sensor size [mm]}/(2 \times \text{focal length [mm]})\} \quad \text{Mathematical Formula 1}$$

The size of imaging elements is the size of either length or width thereof and, the focal length is a value converted into the lens focal point distance in a 35-mm still camera, for example.

The unit scale is information which is calculated based on the above-mentioned scale information and which shows the scale of the subject. In this embodiment, for example, an actual size corresponding to 1 pixel (picture element) is recorded as the unit scale. Calculation of such unit scale is performed by the information registrator 212 at the time of registration of the reference image. Instead, the value calculated in advance may be input by the operator.

The calculation of the unit scale is performed according to the following procedures, for example. First, the size of the subject in the reference image is obtained by calculating the mathematical formula 2 from the distance to the subject, the size of the image sensor, and the focal length of the lens.

$$(\text{distance to the subject [mm]} \times \text{sensor size [mm]})/\text{focal length[mm]} \quad \text{Mathematical Formula 2}$$

The size of imaging elements is the size of either length or width thereof and, the focal length is a value converted into the lens focal point distance in a 35-mm still camera, for example. According to the above mentioned calculation, the actual size [mm] of the subject in a direction (length or width) of the substituted image elements size is specified.

A size in real scale corresponding to 1 pixel is calculated by dividing the subject size calculated in this manner by the image size (the number of pixels) in the direction (length or width) of the imaging size used for the calculation.

The information retriever 213 retrieves and acquires the corresponding record from the reference image storing table based on the key information received from the information display apparatus 100 by the communication processor 211. The position information which shows the current position of the information display apparatus 100, and/or the like, is acquired as the key information, and the record of which the index information is the acquired key information is specified. The communication processor 211 transmits at least the capturedata of the reference image, the superimposing information, the scale information, the unit scale, and/or the like (hereinafter, referred to as "AR data"), among the information recorded in the specified record, to the information display apparatus 100.

Although each of functions described above are logically realized by the controller 210 in this embodiment, a part of or all of the functions may be realized by hardware such as ASIC, for example.

The example of operations by the information display apparatus 100 and the information provision apparatus 200 having configurations as explained above will be described below.

Figure 8:
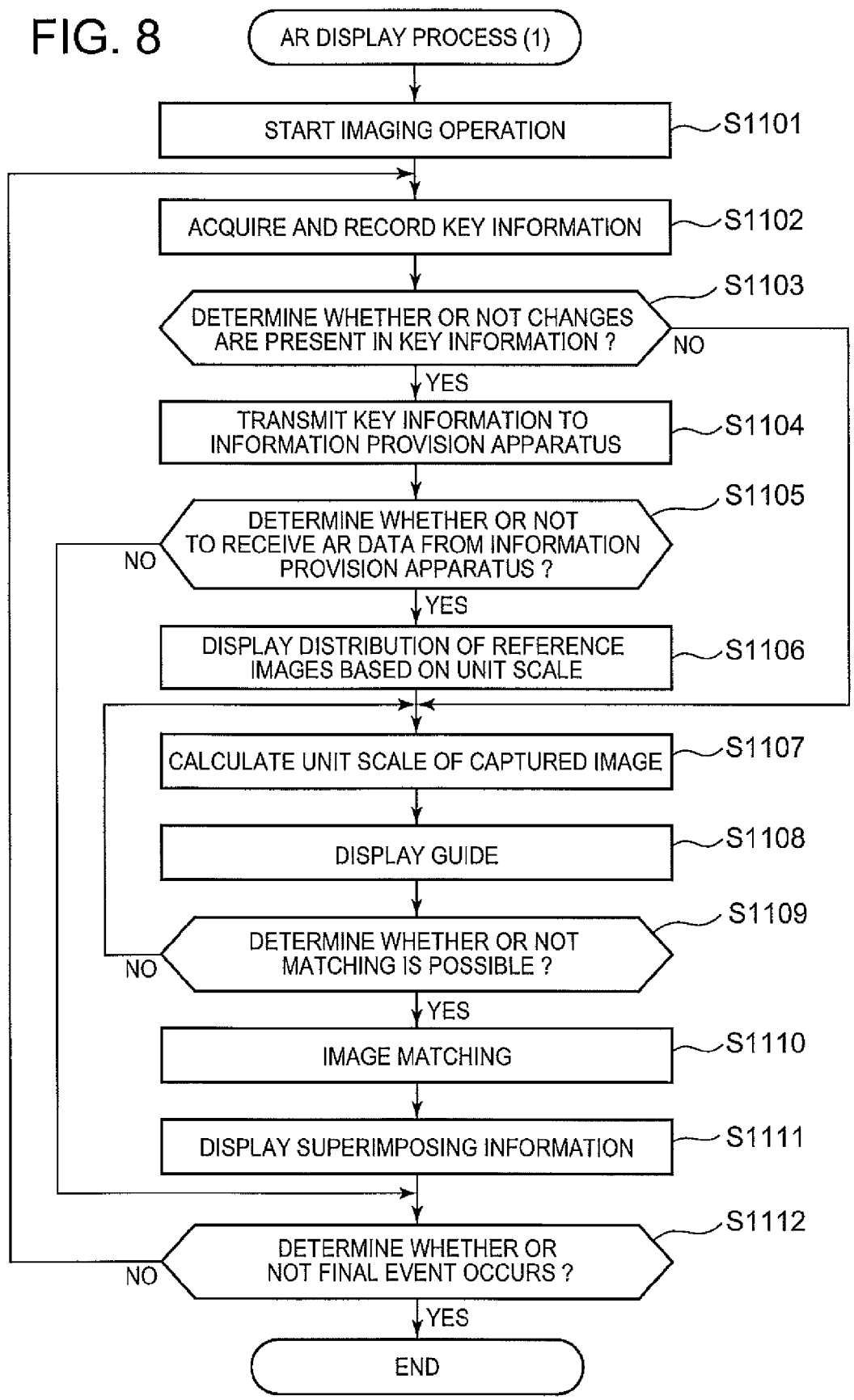
FIG. 8 is a flowchart for explaining "AR display process (1)" of a first embodiment of the present disclosure.

First, operations of the information display apparatus 100 will be described with reference to a flowchart shown in FIG. 8. FIG. 8 is the flowchart for explaining the "AR display process (1)" which is performed in the information display apparatus 100 of this embodiment.

When the AR application is started by the AR processor 111, the AR processor 111 notifies the fact to the imaging processor 112 and the matching processor 113. The imaging processor 112 which received the notification controls the imager 140, and an imaging operation is started (step S1101).

When the imaging operation is started, the matching processor 113 controls the key information acquirer 130, and acquisition operation of key information is performed. The acquisition of position information is at least performed by the GPS module, and/or the like. When the acquisition of the position information is the successful, an attempt to acquire other key information is made. When the acquisition of the position information is unsuccessful, the matching processor 113 waits until acquisition is possible or performs an error process such as completing the present process, since the AR service cannot be provided.

Then, when the key information which includes at least position information has been acquired, the matching processor 113 records the acquired key information in the storer 160 (step S1102). The key information recorded here will be deleted at the time of finishing this process.

The matching processor 113 determines whether or not the recorded key information has changed (step S1103). Since there is no last record in a case where the key information is acquired right after starting the process, the matching processor 113 determines "changed" (step S1103: Yes).

In this case, the matching processor 113 controls the communicator 120 to transmit the acquired key information to the information provision apparatus 200 through the communication network NW (step S1104).

Figure 9:
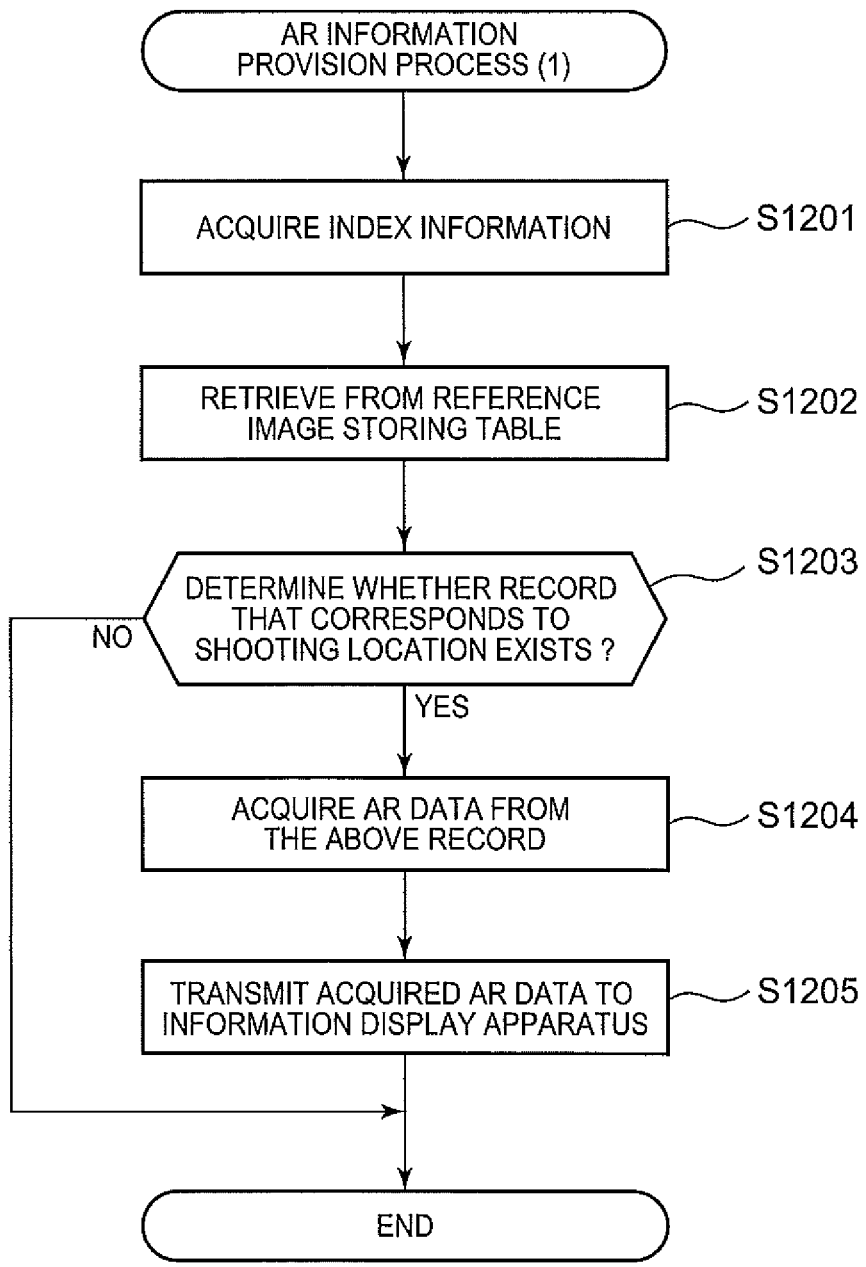
FIG. 9 is a flowchart for explaining "AR information provision process (1)" of the first embodiment of the present disclosure.

When the information provision apparatus 200 has received the key information transmitted from the information display apparatus 100 in this manner, "AR information provision process (1)" for transmitting the AR data to the information display apparatus 100 is performed in the information provision apparatus 200. The "AR information provision process (1)" performed in the information provision apparatus 200 of this embodiment will be described with reference to a flowchart shown in FIG. 9.

When the communication processor 211 has received the key information which the information display apparatus 100 has transmitted, the information retriever 213 acquires the information corresponding to the index information in the reference image storing table from the received key information (step S1201). The position information which shows a shooting location by the information display apparatus 100 is acquired from the key information.

The information retriever 213 retrieves a record in which the position information corresponding to the shooting location is recorded with the acquired index information (position information) as a retrieving subject from the reference image storing table in the storer 240 (step S1202) and, determines whether or not any record in which the position information corresponding to the shooting location is recorded exists in the reference image storing table (step S1203). In retrieving based on the position information, the information retriever 213 retrieves not only the record in which the position information showing the shooting location is recorded, but also the record in which the position information showing an area near the shooting location (an area a predetermined distance away from the shooting location) is recorded.

In a case where the record in which the position information corresponding to the shooting location by the information display apparatus 100 is recorded exists in the reference image storing table (step S1203: Yes), the information retriever 213 acquires the AR data from the record concerned (step S1204), and transfers the AR data to the communication processor 211.

The communication processor 211 controls the communicator 220 to transmit the AR data, which is acquired by the information retriever 213, to the information display apparatus 100 through the communication network NW (step S1205), and finishes the process.

On the other hand, in a case where the record in which the position information corresponding to the shooting location does not exist in the reference image storing table (step S1203: No), the information provision apparatus 200 finishes the process without transmitting the AR data to the information display apparatus 100. In this case, the information provision apparatus 200 may transmit notification information showing that the AR service cannot be provided at the current position, and/or the like, to the information display apparatus 100.

The transmission and reception operations with the information display apparatus 100 described above is realized by utilizing a known transaction technique which uses CGI (Common Gateway Interface) technique, and/or the like.

Return to the flowchart of FIG. 8, operations of the information display apparatus 100 to which the AR data is returned will be described.

When the AR data has been transmitted from the information provision apparatus 200, the communicator 120 of the information display apparatus 100 receives the AR data through the communication network NW. When such reception has been made (step S1105: Yes), the matching processor 113 stores the received AR data in the storer 160, and notifies that to the AR processor 111.

The AR processor 111 displays or outputs the live view image which the imager 140 is imaging now by controlling the inputter-outputter 150, generates an image showing distribution of the received reference image based on the unit scale of the received AR data, and displays or outputs the generated image to the inputter-outputter 150 (step S1106).

The contents of the processes will be explained with reference to the drawings based on the examples of scenes which may be supposed. In this embodiment, the AR service is utilized in a town with the stores A to E as shown in FIG. 10A. With respect to the store A, the reference image, and/or the like, is registered in the information provision apparatus 200 and the store A can provide the AR service. However, with respect to the stores B to E, the information is not registered in the information provision apparatus 200. Thus the stores B to E can not provide the AR service.

With respect to the store A, the reference images as shown in FIG. 10B are registered in the information provision apparatus 200. As shown in the Figure, a reference image AA which is photographed the external appearance of the store A and, reference images AB to AZ which are photographed products available for sale in the store A are registered in the information provision apparatus 200. All of the image sizes of these reference images are the same.

Moreover, the reference images are photographed so that only the target subject may be fit within the image size thereof. In such a case where a plurality of reference images about a plurality of subjects are prepared, since the sizes of the subjects are not uniform, the scales of the subjects for the images also differ. Specifically, an external appearance of a building is photographed in full angle of view in the reference image AA whereas a pen is photographed in full angle of view in the reference images AZ, thus sizes of them in real scale corresponding to one pixel is quite different.

In this case, if the external appearance of the store A is photographed in full angle of view of the photographed image, the matching with the reference image AA can be performed. However, even if the pen of product is in the image, the matching with the reference image AZ cannot be performed since the scale of the pen in the image is too small. Specifically, if the photograph is not taken by a suitable angle of view according to the target subject, the information provided by the AR service cannot be acquired appropriately.

In order to resolve such inconvenience, according to this embodiment, the unit scale registered with the reference image in the reference image storing table of the information provision apparatus 200 is used to guide the user so that the user can shoot a photograph with a suitable angle of view.

Figure 11A:
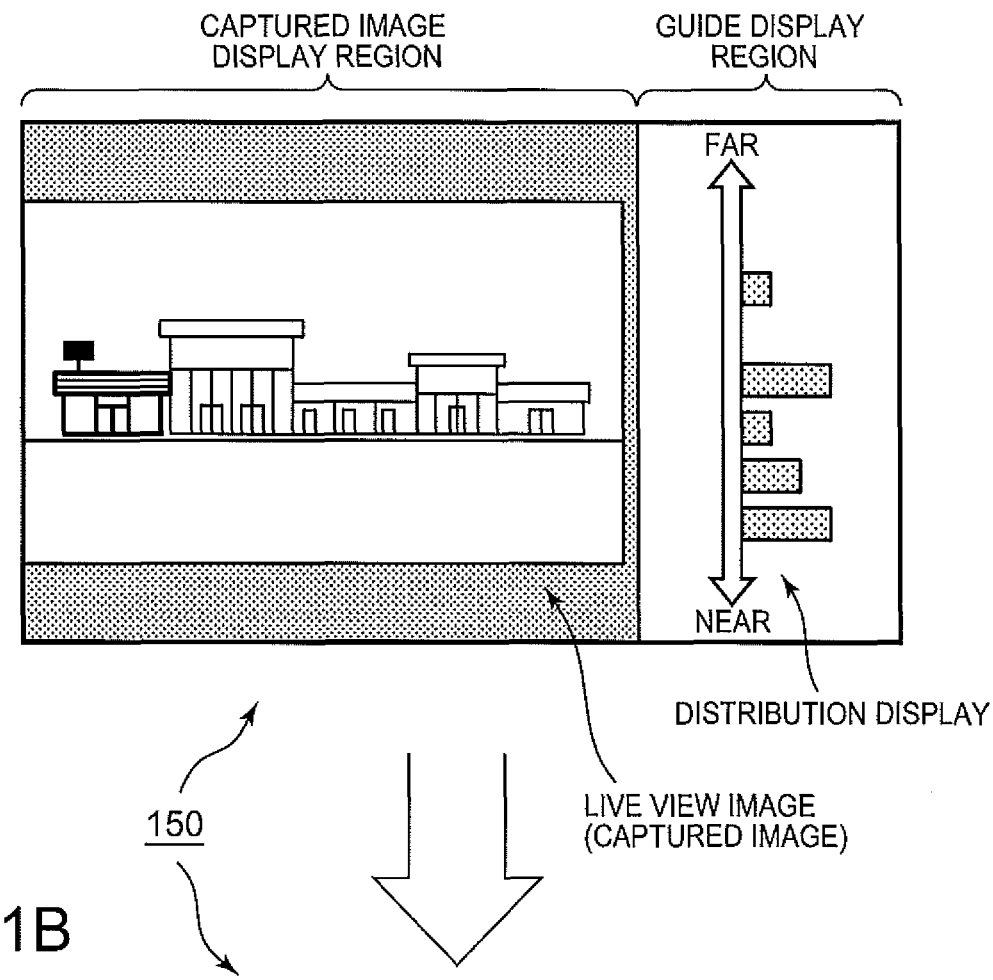
FIGS. 11A and 11B are diagrams showing examples of screen displays concerning the "AR display process (1)" shown in FIG. 8.

Therefore, in this embodiment, the distribution display based on the unit scale of the reference image received from the information provision apparatus 200 is performed in the step S1106. A display example in this case is shown in FIG. 11A. As shown in the Figure, a "captured image display region" and a "guide display region" are set to the inputter-outputter 150, and the live view image by the imager 140 is displayed on the captured image display region. In the guide display region, the distribution display as shown in FIG. 11A is applied.

In this distribution display, as shown in the Figure, for example, arrows which point upwards and downwards along the vertical direction is displayed, and on the right side of the upward and downward pointing arrows, the distribution of the reference images based on the unit scales is displayed in a graph manner. In the example of FIG. 11A, the further the position of the distribution is upwards along the vertical line with the upward and downward pointing arrows, the farther the distance from the information display apparatus 100 (camera) to the subject of the reference image corresponding to the distribution, and the further the position of the distribution is downwards along the vertical line with the upward and downward pointing arrows, the closer the distance from the information display apparatus 100 (camera) to the subject of the reference image corresponding to the distribution.

Specifically, since the unit scale is the size in real scale corresponding to 1 pixel, the value of the unit scale becomes comparatively large in the image in which the external appearance of the building is shot as the reference image AA (FIG. 10B), and the value of the unit scale becomes comparatively small in the image in which a pen is shot as the reference image AZ. Accordingly, it means that the subject is shot from separated place as the value of the unit scale is large and, it means that the subject is shot from approached place as the value of the unit scale is small.

For this reason, in the distribution display shown in FIG. 11A, distribution is displayed on upper side of the upward and downward pointing arrows that shows farther from the subject of the reference image as the value of the unit scale becomes large, and distribution is displayed on the lower side of the upward and downward pointing arrows which shows closer to the subject of the reference image as the value of the unit scale becomes small. The horizontal direction of the distribution display indicates the number of images of the unit scale concerned. In the example of FIG. 11A, the distribution displayed near the upper right side of the vertical line with the upward and downward pointing arrows corresponds to the reference image AA (FIG. 10A) in which the external appearance of the store is shot, and a plurality of distributions near the lower right side of the vertical line with the upward and downward pointing arrows correspond to a plurality of reference images AB-AZ (FIG. 10B) in which the product is shot.

Returning to the flowchart of FIG. 8, the explanation of the processes is continued. When the distribution display is performed at the step S1106 as above-described manner, the AR processor 111 calculates the unit scale about the image which have captured by the imager 140 (step S1107). The unit scale is calculated by a similar manner as the information registrator 212 of the information provision apparatus 200 described above using the performance information (sensor size, and/or the like) of the imager 140, the photographing settings at that time (image size, lens focal point distance, and/or the like), the distance to the subject acquired by the ranging operation. If the imager 140 is a stereo camera, since the ranging using the principle of triangulation can be performed, the distance to the subject can be obtained more correctly.

Figure 11B:
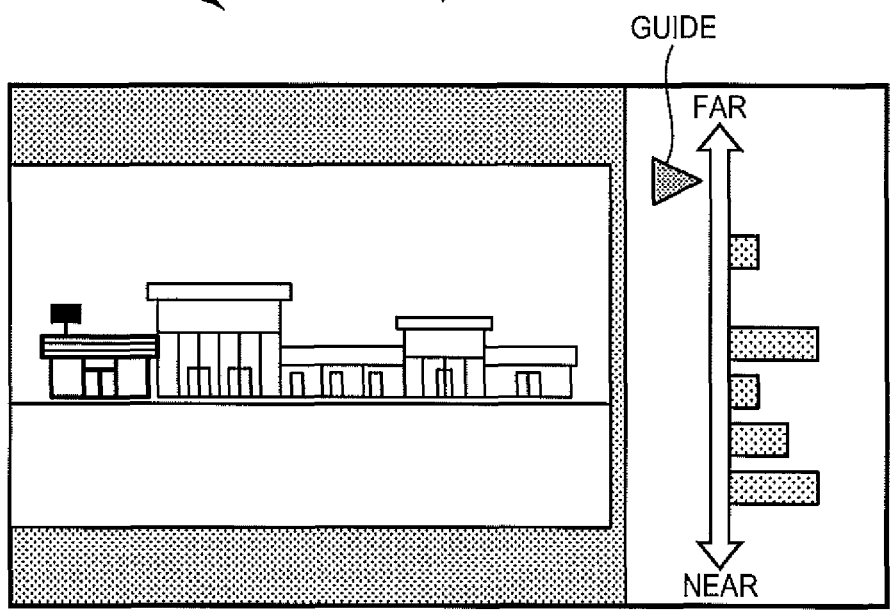

When the unit scale about the captured image has been calculated, the AR processor 111 displays the guide as shown in FIG. 11B on the guide display region (step S1108). This guide reflects the calculated unit scale of the captured image and, the guide is displayed on the left side of the upward and downward pointing arrows in the distribution display.

The live view image, displayed on the captured image display region in FIG. 11B, has a wide angle of view in which not only the store A that can provide the AR service but also the stores B to E that can not provide the AR service are captured. In such case, even if the store A is included in the angle of view, since the size of the store A in the entire image is small, the scale of the live view image is different from the scale of the reference image AA (FIG. 10B) and the matching may not be performed appropriately.

In this case, as shown in FIG. 11B, the guide reflecting the unit scale of the captured image is displayed so as to be located upper than the distribution showing the reference image AA. In the example of FIG. 11B, since the distribution component of the reference image does not exist at a guide position, the user can recognize that the matching for applying the AR display cannot be performed unless the user approaches the subject or causes the angle of view to be telescopic side by zoom.

In this way, in a case where it is not possible to apply the matching using the reference image acquired from the information provision apparatus 200 with current captured image (step S1109: No), the process returns to the step S1107 and the AR processor 111 calculates the unit scale of the captured image again. Specifically, when the user who has recognized that the matching cannot be applied according to the guide display causes the angle of view to be narrower as shown in FIG. 12A by approaching the subject or causing the zoom to be telescopic side, the unit scale for the captured image is calculated (step S1107).

Figure 12A:
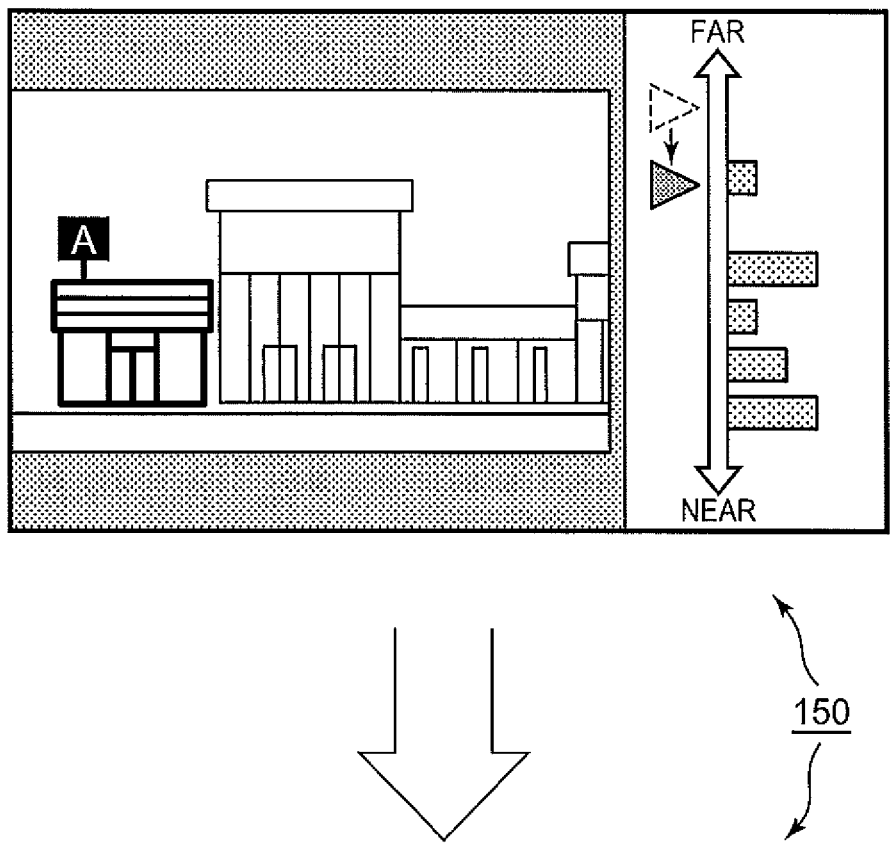
FIGS. 12A and 12B are diagrams showing examples of screen displays concerning the "AR display process (1)" shown in FIG. 8.

In this case, the guide display is made according to the calculated unit scale (step S1108), and the guide is displayed so as to move downward as shown in FIG. 12A. When the guide moves to a position corresponding to distribution component of the reference image AA as shown in the Figure, it is possible to apply the matching with the reference image AA by the present angle of view (step S1109: Yes).

Figure 12B:
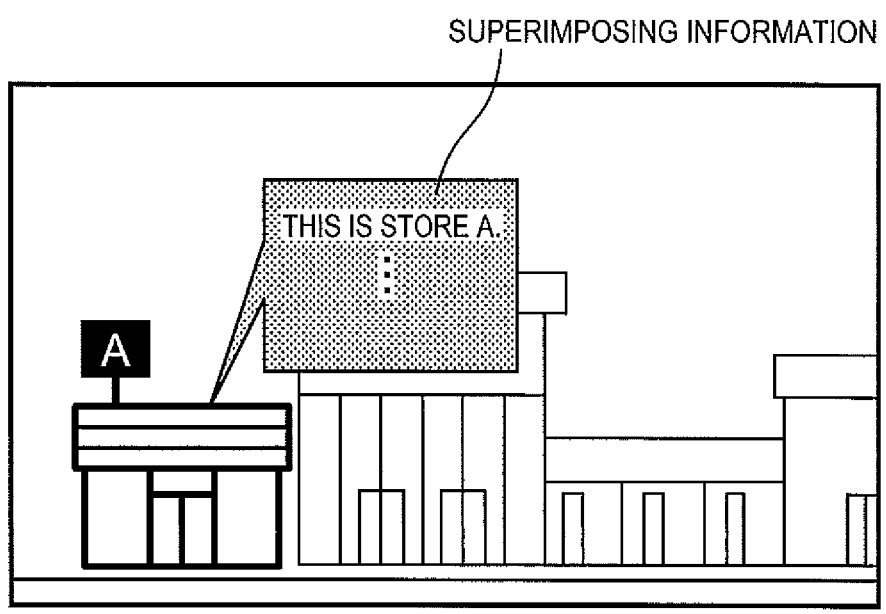

In this case, the matching processor 113 applies the matching the reference image (in this case, the reference image AA) of the unit scale corresponding to the guide with the captured image, by performing known image processing in the AR display (step S1110), and recognizes the position of the store A in the captured image. When the matching is applied in such manner, the captured image is displayed in full-screen by the AR processor 111, as well as the superimposing information which is associated with the reference image AA and provided from the information provision apparatus 200 is displayed superimposing on a position corresponding to the store A in the captured image as shown in FIG. 12B for example (step S1111).

Then, for example, if predetermined termination events, such as termination instruction of the AR application and power off of the information display apparatus 100, do not occur (step S1112: No), the processes after the step S1102 are performed repeatedly. Although the acquisition operation of the key information is performed in the step S1102, if the information display apparatus 100 does not move greatly, the key information acquired last time does not change (step S1103: No). In such case, the process proceeds to the step S1107 and the guide display (update of the guide position according to the change of angle of view) based on the current unit scale is performed.

On the other hand, in a case where the key information which is newly acquired is changed (step S1103: Yes), the key information concerned is anew transmitted to the information provision apparatus 200 (step S1104), and following processes are performed using the AR data provided based on the key information (from step S1105).

When the reference image corresponding to the key information transmitted from the information display apparatus 100 does not exist in the information provision apparatus 200, as described above, the notification information which indicates that the AR data is not transmitted or the AR service cannot be provided is transmitted from the information provision apparatus 200. In such case (step S1105: No), the process proceeds to the step S1112, and the operation in accordance with the existence or absence of the termination event is performed. Specifically, if the termination event does not occur (step S1112: No), processes are repeated again from the acquisition operation of the key information (from step S1102).

In a case where the termination event occurs (step S1112: Yes), the key information recorded in the storer 160 is eliminated, and the processes are finished.

As explained above, according to this embodiment, when the terminal device applies the AR display, the distribution based on the subject scale of the reference image prepared relating to the shooting location is displayed and, the scale of the subject in the captured image is displayed with guide on the distribution display. Thus, it is possible to easily set the angle of view and shooting location that is suitable for the matching using the provided reference image and, it is possible to improve the convenience at the time of utilizing the AR display.

Figure 13A:
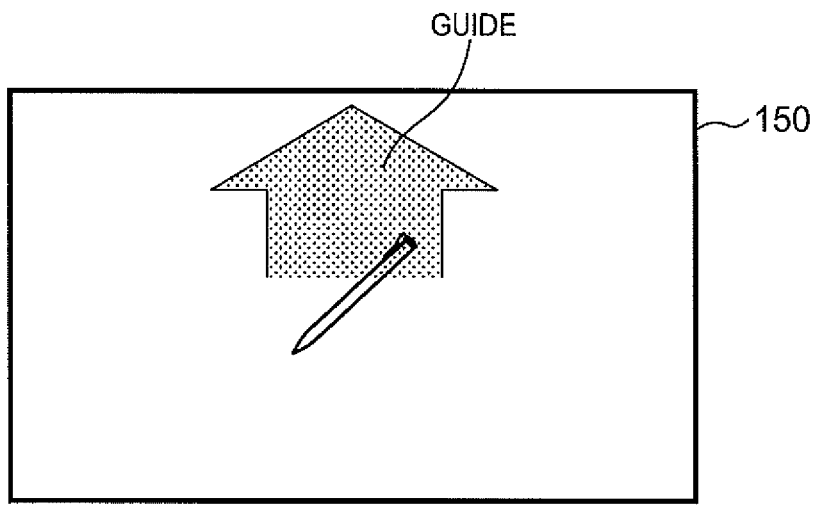
FIGS. 13A to 13C are diagrams showing other examples of the guide display.

Although the guide displays as shown in FIGS. 11A, 11B and FIGS. 12A, 12B are exemplified in this embodiment, the method and configuration of the guide displays are arbitrary. Accordingly, the present disclosure should not be restricted to the present examples. For example, in a case where the image of subject in the captured image is small because of being separated from the subject, the information display apparatus 100 may display an upward pointing arrow as the guide, as shown in FIG. 13A, for inducing a change of the angle of view by approaching the subject or zoom-in.

Figure 13B:
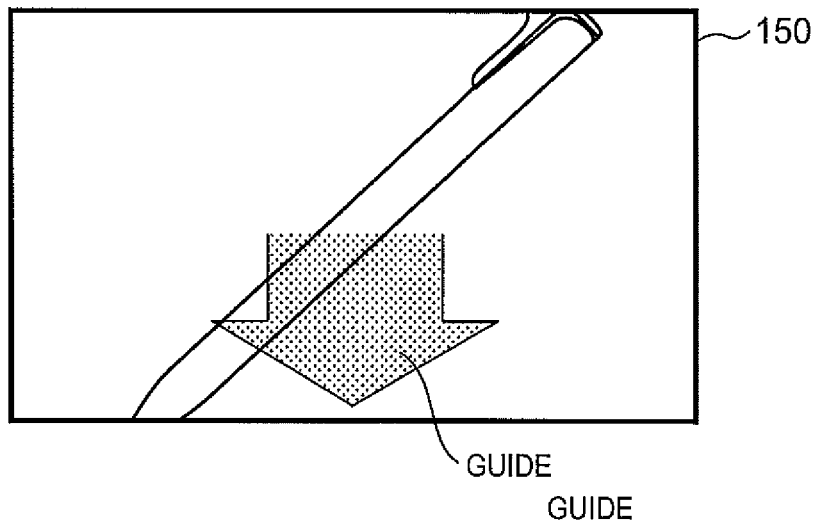

Conversely, in a case where the image of subject is not within the angle of view because of being close to the subject too much, the information display apparatus 100 may display an downward pointing arrow as the guide, as shown in FIG. 13B, for inducing a change of the angle of view by separating from the subject or zoom-out.

Figure 13C:
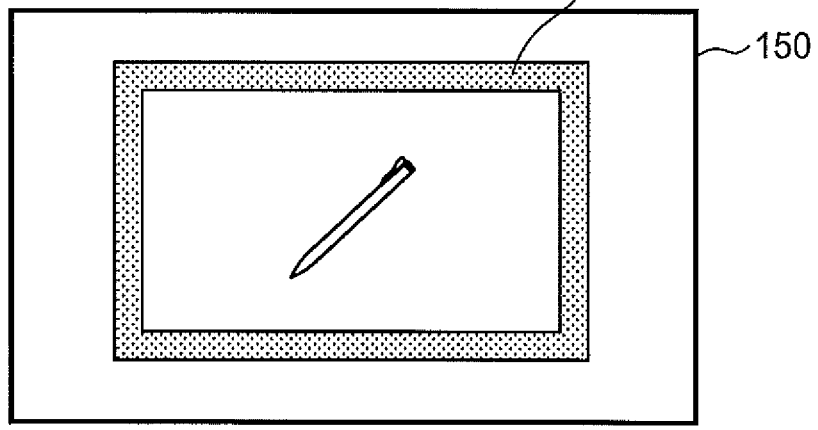

Alternatively, the information display apparatus 100 may display a rectangle frame shown in FIG. 13C showing in the angle of view required for the matching as a guide, and induce the change of the angle of view so that the image of the subject image is to be framed in the rectangle frame.

These guide displays are effective when causing the angle of view to be close to more suitable angle, for example, in a case where the unit scales of the captured image and the reference image are near. Besides, it is possible to induce an effective change of the angle of view by providing a more intuitive guide display. Therefore, the guide display exemplified in FIGS. 11A and 11B may be applied first, then the guide display may change to the guide display as shown in FIGS. 13A to 13C at the stage in which the unit scales are close to some extent. Alternatively, in a case where the number of the reference images is small, the guide display as shown in FIGS. 13A to 13C may be performed from the beginning.

In this embodiment, although more accurate distance information is acquired by acquiring the distance to the subject which is required to calculate the unit scale according to the ranging by the stereo camera, the method for acquiring the distance to the subject is arbitrary. For example, a focus distance of a lens may be used for acquiring the distance to the subject. In this case, the imager 140 provided in the information display apparatus 100 may not be the exemplified stereo camera, and the imager 140 may be configured by a general monocular-type camera module.

Second Embodiment

In the above-described first embodiment, when the information display apparatus 100 has acquired the key information such as position information by GPS, and/or the like, the information provision apparatus 200 searches the AR data, based on the key information, to provide the AR data to the information display apparatus 100. However, when the providers of the AR service are expanded, the providers of the AR service in the vicinity of the current position are increased. Thus, the number of times of inquiry to the information provision apparatus 200 is increased, the amount of the AR data provided by one time is also increased and, the traffic load or the memory usage in the information display apparatus 100 is increased, thus there is a possibility of making the performance worse.

Moreover, as mentioned above, the information display apparatus 100 may acquire two or more kinds of key information items, thus in some cases, a large amount of reference images corresponding to a plurality of key information items may be compared one after the other. This also becomes a factor which makes the performance of the information display apparatus 100 worse.

Moreover, if the same kind of key information is used, a user may return to the course before arriving at a target place when using the position information by the GPS, for example. If the information display apparatus 100 accesses the information provision apparatus 200 in accordance with a change of the position information, the performance of the information display apparatus 100 is decreased and it is not preferable for a user's convenience.

It is possible to significantly reduce the number of accesses to the information provision apparatus 200 if the AR data is stored in the information display apparatus 100. However, it takes time for matching process when AR data is stored in the information display apparatus 100, in which the matching is performed. Therefore, a decrease in the performance is not prevented.

In this embodiment, it is intended to reduce the number of times of inquiry to the information provision apparatus 200 and to increase an efficiency of the memory usage in the information display apparatus 100 by management of the acquired key information and AR data.

Figure 14:
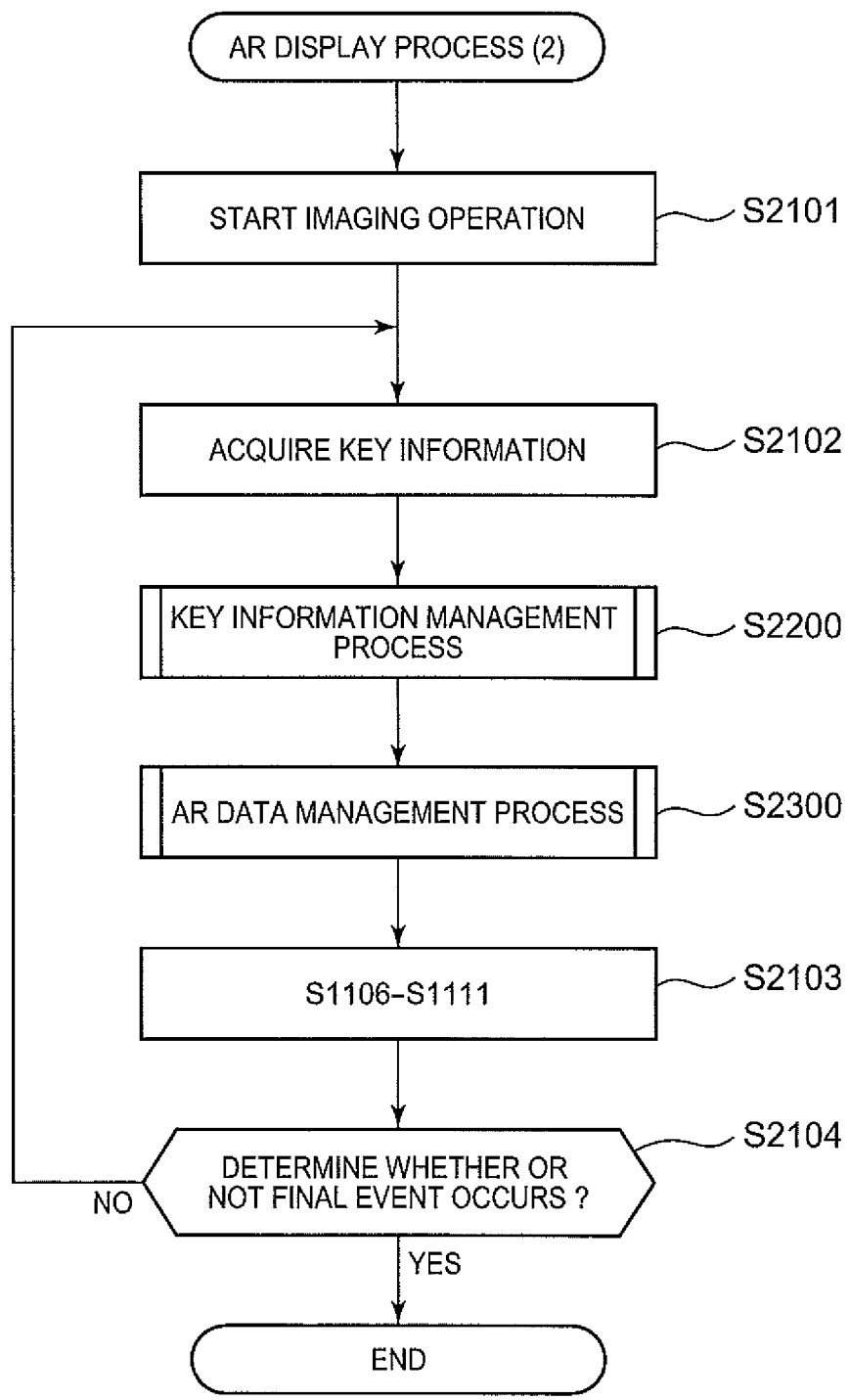
FIG. 14 is a flowchart for explaining "AR display process (2)" concerning a second embodiment of the present disclosure.

The "AR display process (2)" performed by the information display apparatus 100 in order to achieve this matters will be explained with reference to a flowchart of FIG. 14. This process is executed instead of the "AR display process (1)" of the first embodiment.

Whereas the position information acquired by GPS, and/or the like, is necessary as the key information in the above mentioned first embodiment, in this embodiment, even if other kind of key information is acquired without acquiring the position information, the information display apparatus 100 inquires to the information provision apparatus 200.

As described above, the key information may be transmitted from facilities such as the store. If a transmitting device according to the a short range wireless communication or the visible light communications is installed in the front of the store and/or the like, and the key information concerning the AR data about the store is transmitted, the key information can be acquired at the time of being close to the store. In this case, the key information transmitted can be the position information corresponding to the position information acquired by GPS, and/or the like. In addition, in a case where the AR data, and/or the like, about the facility is registered in the information provision apparatus 200, identification information which shows the facility may be sent as the key information.

In such case, a "group ID" as shown in FIG. 15 is added in the reference image storing table of the information provision apparatus 200 as index information. Associating a plurality of AR data to one group ID allows the efficiency of the search in the information provision apparatus 200 to increase.

Moreover, in this embodiment, unique identification information (AR data identification information) is provided to each AR data, as shown in FIG. 15. In this case, the information provision apparatus 200 of this embodiment transmits the identification information (AR data identification information) corresponding to the key information to the information display apparatus 100 when the key information is transmitted from the information display apparatus 100 and, the information provision apparatus 200 transmits the AR data corresponding to the identification information (AR data identification information) to the information display apparatus 100 when the identification information (the AR data identification information) is transmitted from the information display apparatus 100.

The key information acquired by the information display apparatus 100 includes one transmitted from an RFID chip attached to a price card, and/or the like, which is provided to the product, and/or the like, sold in the store, and one expressed by a displayed two dimensional code. These key information items are identification information associated with the AR data about the products. In this embodiment, such identification information is dealt with same one as the AR data identification information mentioned above.

The operation according to the "AR display process (2)" performed under the above assumption will be described. The process starts by an execution instruction for the AR application by the user as well as the first embodiment.

Starting the process, the imaging processor 112 controls the imager 140, and an imaging operation is started (step S2101). Further, the matching processor 113 controls the key information acquirer 130, and acquisition operation of key information is performed (step S2102). The acquired key information is temporarily stored on a storage area such as RAM, for example.

Although the acquired key information is recorded on the storer 160 as well as the example in the first embodiment, in this embodiment, the "key information management table" as shown in FIG. 18A is created in the storer 160, and the acquired key information and additional information are stored in this table.

The key information management table is configured by records in which a record No. is a key as shown in FIG. 18A. The number of records configuring the table has been defined according to a capacity assigned to the AR application among a capacity of the storer 160 and processing ability of the information display apparatus 100, and/or the like. Specifically, the number of records is defined so that the data amount of the key information to be recorded is an amount by which the performance for execution of the AR application does not decrease. In this embodiment, the table is configured by n records, for example.

Moreover, the number of the key information items acquired in the step S2102 is N (pieces). As described above, since the key information is acquired by several ways, in a case of performing key information acquisition operation at the same place, a plurality of key information items may be acquired simultaneously. For example, the position information is acquired by GPS as well as the group ID is acquired by the short range wireless communication. Thus, the number of key information items N is N>=1.

The key information management table stores, as shown in FIG. 18A, acquired key information (for example, the position information, the group ID, the identification information, and/or the like), information indicating a type of way by which the key information is acquired (for example, types such as GPS, visible light communications, RFID, IrDA, Bluetooth (trademark) and two dimensional code, and/or the like), usage date and time, identification information (AR data identification information) transmitted from the information provision apparatus 200 with respect to the key information, a flag indicating that the record should be excepted from a deletion candidate ("exclusion flag"), and/or the like.

The "usage date and time" refers to date and time when the acquired key information acquired is recorded. Moreover, when key information corresponding to the key information already recorded on the key information management table is acquired again, the usage date and time is updated to that time.

Figure 16:
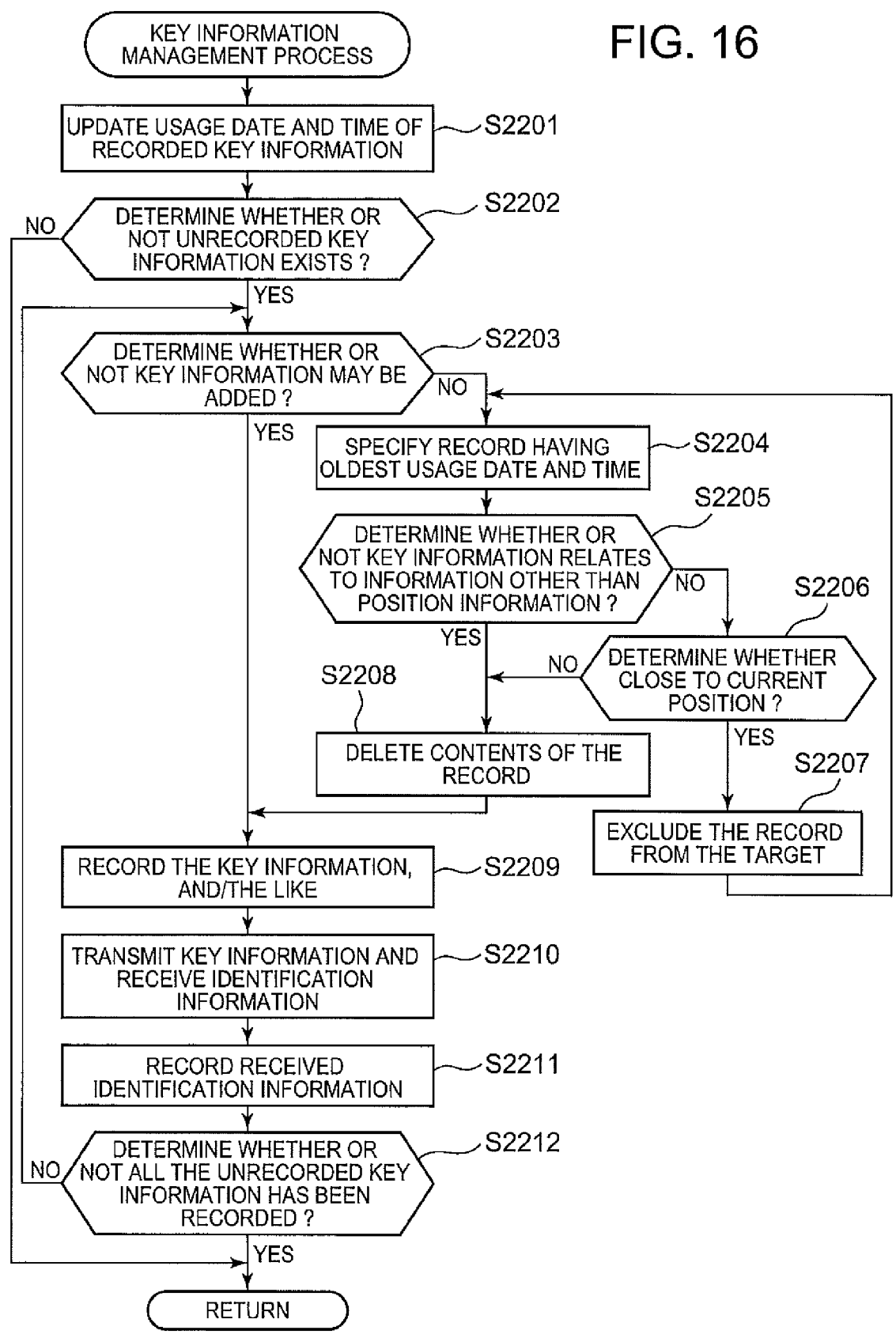
FIG. 16 shows a flowchart for explaining "key information management process" performed in the "AR display process (2)" shown in FIG. 14.

A "key information management process" is performed as a process for storing the key information in such key information management table (step S2200). This "key information management process" will be described with reference to a flowchart shown in FIG. 16.

Starting the process, the matching processor 113 accesses the key information management table in the storer 160 and, in a case where the same key information as the key information stored in the RAM is stored in the key information management table, updates the "usage date and time" corresponding to the key information to current date and time (step S2201). The key information that has been completely recorded in the key information management table among the key information presently acquired and stored in the RAM is deleted from the RAM after updating the usage date and time.

The key information remaining in the RAM after deleting the recorded key information from the RAM is not recorded on the key information management table. In a case where the key information which is not recorded in the key information management table does not exist among the presently acquired key information (step S2202: No), a process is completed by updating the usage date and time alone, and then returning to the flow of the "AR display process (2)" of FIG. 14.

On the other hand, in a case where the key information which is not recorded in the key information management table exists among the presently acquired key information (step S2202: Yes), the matching processor 113 determines whether or not such unrecorded key information can be added into the key information management table (step S2203). As described above, the number of records of the key information management table concerning this embodiment is limited by n, based on the capacity of the storer 160, and/or the like. If there are one or more empty records among such n records, the matching processor 113 determines that the key information can be added (step S2203: Yes).

In this case, the matching processor 113 records, with respect to the key information which remains in the RAM, the key information per se, the information which shows acquisition manner, and the information which shows a present date and time as acquisition date and time in one of the empty records (step S2209). In this case, the matching processor 113 deletes the key information on the RAM.

When one of the key information acquired this time has been recorded on the key information management table, the matching processor 113 controls the communicator 120 so as to transmit the key information to the information provision apparatus 200 through the communication network NW and, acquires corresponding identification information (the AR data identification information) from the information provision apparatus 200 through the communication network NW (step S2210).

In the information provision apparatus 200, when the communicator 220 has received the key information transmitted from the information display apparatus 100, the information retriever 213 accesses the storer 240 to retrieve the identification information (the AR data identification information) associated with the received key information from the reference image storing table shown in FIG. 15. Then the communicator 220 transmits the identification information (the AR data identification information) to the information display apparatus 100.

When the information provision apparatus 200 transmits the identification information (the AR data identification information) in this way, the communicator 120 of the information display apparatus 100 receives the identification information (the AR data identification information). The matching processor 113 records the received identification information (the AR data identification information) into the record in which the key information is recorded in the key information management table in the step S2209 (step S2211).

When recording the key information in one record is completed, the matching processor 113 determines whether or not all of the unrecorded key information in the key management information table has been recorded, by determining whether or not the key information acquired this time remains on the RAM (step S2212).

If the key information acquired this time still remains on the RAM (step S2212: No), the process returns to the step S2203. In a case where information is recorded in all n records, the matching processor 113 determines the key information cannot be added (step S2203: No), and prepares an empty record by deleting contents in any record.

In such situation, the matching processor 113 scans the usage date and time recorded in the key information management table, and specifies the record in which the oldest usage date and time is recorded (step S2204). Then, the matching processor 113 determines whether or not the key information recorded in the record is ones other than position information (such as group ID and identification information) (step S2205).

In a case where the key information which is of other than position information is recorded in the record (step S2205: Yes), the matching processor 113 deletes the contents of the record (step S2208). Since one empty record is prepared in this way, the information is recorded into the empty record by the processes of the step S2209 and following steps.

On the other hand, in a case where the key information in the record in which the oldest usage date and time is recorded is the position information (step S2205: No), the matching processor 113 determines whether or not the position information recorded in the record concerned is a position close to a current position, based on the position information and the current position (step S2206).

If position information is included in the key information acquired this time, the matching processor 113 uses the position which the position information shows as a current position. If position information is not included, the matching processor 113 acquires current position information by controlling the key information acquirer 130. Then, the matching processor 113 determines whether or not the position which the position information shows is close to the current position by calculating a distance between two points from the latitude and longitude which show each position thereof and, comparing the calculated distance with a predetermined threshold. The threshold in this case may be arbitrary. The threshold may be set up by the manufacturer of the information display apparatus 100, and also may be arbitrarily set up by the user.

If the position information recorded in the record with the oldest usage date and time shows the position close to the current position according to such operation (step S2206: Yes), the matching processor 113 excludes the record concerned from a deletion candidate (step S2207), and returns to the step S2204. In this case, a flag (exclusion flag) showing that the record should be excluded from the deletion candidate is set in the record, for example.

On the other hand, if the record is that the position information showing a position far from the current position is recorded therein (step S2206: No), the process proceeds to a step S2208 and the matching processor 113 deletes the contents in the record. Then, each kind of information items is recorded in the record concerned by performing the processes of the step S2209 and following steps.

Thus, when all of the key information acquired this time has been recorded in the key information management table (step S2212: Yes), the matching processor 113 finishes this process and returns to the flow of the "AR display process (2)" (FIG. 14).

In this embodiment, the AR data acquired from the information provision apparatus 200 is recorded in an "AR data management table" as shown in FIG. 18B generated in the storer 160.

As shown in the Figure, records in which record No. is used as a key are created in the "AR data management table". Moreover, in each record, the identification information (the AR data identification information) corresponding to the key information is recorded. In addition, AR data (particularly, the reference image, the superimposing information, the scale information, the unit scale information, and/or the like) corresponding to the identification information (the AR data identification information), and information showing the usage date and time of the AR data, and/or the like, are recorded. The date and time when the AR data is acquired from the information provision apparatus 200 is recorded as the "usage date and time."

The number of records configuring the AR data management table has also been defined according to the capacity of the storer 160, the capacity being assigned to the AR application, and processing ability of the information display apparatus 100. Specifically, the number of records is defined so that the amount of information to be recorded is an amount by which the performance for execution of the AR application does not decrease. In this embodiment, the table is configured by m records.

Figure 17:
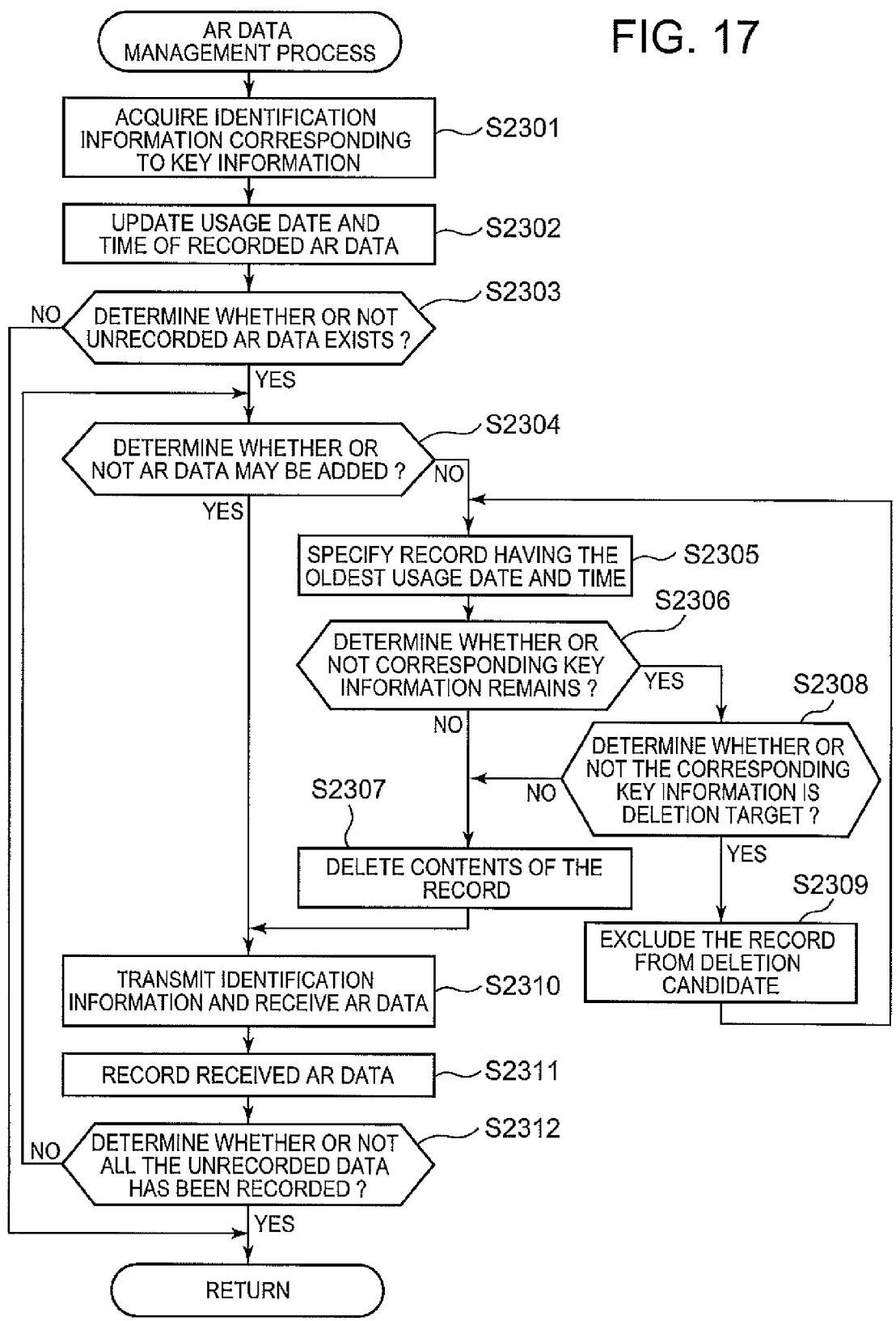
FIG. 17 shows a flowchart for explaining "AR data management process" performed in the "AR display process (2)" shown in FIG. 14.

In the "AR display process (2)", after executing the above-described "key information management process" (step S2200), an "AR data management process" for recording the AR data in such AR data management table is performed (step S2300). This AR data management process will be explained with reference to a flowchart shown in FIG. 17.

Starting the process, first, the matching processor 113 accesses the key information management table (FIG. 18A) in the storer 160, specifies the record in which the date and time corresponding to the key information acquisition operation of this time is recorded as the usage date and time and, specifies the identification information (the AR data identification information) recorded in the record. Specifically, the matching processor 113 specifies the identification information (the AR data identification information) associated with the key information which is acquired this time. In this case, the matching processor 113 acquires the specified identification information (the AR data identification information) from the key information management table (step S2301), and stores the acquired identification information (the AR data identification information) temporarily in the RAM.

Next, the matching processor 113 accesses the AR data management table (FIG. 18B) in the storer 160, specifies the record in which the identification information (the AR data identification information) acquired in the step S2301 has already recorded and, updates the "usage date and time" of the record concerned to current date and time (step S2302). Specifically, in a case where the AR data, associated with the key information which is acquired this time, has already been recorded in the AR data management table, the "usage date and time" is updated as it is considered that the AR data is acquired from the information provision apparatus 200 at this time.

When the "usage date and time" has been updated with respect to the identification information (the AR data identification information) which shows that the AR data has been recorded in the AR data management table, the identification information is deleted from the RAM. If the identification information remains in the RAM after such deletion, the AR data shown by the identification information remaining in the RAM is not recorded in the AR data management table.

Moreover, if the identification information does not remain in the RAM, all of the AR data corresponding to the key information acquired this time has been recorded in the AR data management table. In this case (step S2303:No), the matching processor 113 finishes the process after only updating the "usage date and time" with respect to the AR data corresponding to the key information acquired this time and, the process returns to the flow of the "AR display process (2)" (FIG. 14).

On the other hand, in a case where the AR data which is not recorded in AR data management table exists (step S2303: Yes), the matching processor 113 determines whether or not the AR data can be added into the AR data management table (step S2304). As described above, the number of records of the AR data management table concerning this embodiment is limited by m based on the capacity of the storer 160, and/or the like. If one or more empty records exist among such m records, the matching processor 113 determines that the AR data can be added (step S2304: Yes).

In this case, the matching processor 113 selects one of the identification information (the AR data identification information) stored in the RAM. Then, the matching processor 113 controls the communicator 120 to transmit the selected identification information (the AR data identification information) to the information provision apparatus 200 through the communication network NW and, acquires the AR data associated with the identification information (the AR data identification information) from the information provision apparatus 200 (step S2310).

In the information provision apparatus 200, when the communicator 220 has received the identification information (the AR data identification information) transmitted from the information display apparatus 100, the information retriever 213 accesses the storer 240 to retrieve the AR data associated with the received identification information (the AR data identification information) from the reference image storing table shown in FIG. 15. Then the communicator 220 transmits the AR data to the information display apparatus 100.

When the information provision apparatus 200 transmits the AR data in this way, the communicator 120 of the information display apparatus 100 receives the AR data. The matching processor 113 records the received AR data in one of the empty records (step S2311). The matching processor 113 also records the information which shows the date and time of this time as the usage date and time of the AR data. At this time, the matching processor 113 deletes the identification information (the AR data identification information) relating to the AR data recorded in the AR data management table from the RAM, among the identification information (the AR data identification information) stored in the RAM.

The matching processor 113 determines whether or not all of the AR data that had not been recorded in the AR data management table has been recorded in the AR data management table, by determining whether or not the identification information (the AR data identification information) remains on the RAM (step S2312).

In a case where the identification information (the AR data identification information) remains on the RAM (step S2312: No), the process returns to the step S2304 and, the processes of acquisition and record of the AR data are performed with respect to the identification information (the AR data identification information). In a case where information is recorded in all m records of the AR data management table, the matching processor 113 determines that the AR data cannot be added (step S2304: No) and, prepares an empty record by deleting the contents in any record.

In such situation, the matching processor 113 scans the usage date and time recorded in the AR data management table, and specifies the record in which the oldest usage date and time is recorded (step S2305). Then, the matching processor 113 specifies the identification information (AR data identification information) currently recorded on the record.

Next, the matching processor 113 accesses the key information management table to determine whether a record in which the specified identification information (the AR data identification information) is recorded exists. Specifically, the matching processor 113 determines whether or not the key information corresponding to the AR data with the oldest usage date and time remains in the present key information management table (step S2306).

In a case where the corresponding key information does not remain in the key information management table (step S2306: No), the matching processor 113 deletes the contents in the record specified in the step S2305 from the AR data management table (step S2307). Since one empty record is prepared in this way, the information corresponding to the record is recorded by the processes after the step S2310.

On the other hand, in a case where the key information corresponding to the AR data with the oldest usage date and time remains in the present key information management table (step S2306: Yes), the matching processor 113 determines whether or not the key information has been excluded from the deletion candidate in the step S2207 of the "key information management process" (FIG. 16), by determining whether or not the "exclusion flag" is set in the record relating to the key information (step S2308).

In a case where the key information corresponding to the AR data specified in the step S2305 has been excluded from the deletion candidate in the key information management table (step S2308: Yes), the matching processor 113 also excludes the record specified in the step S2305 from the deletion candidate (step S2309), and the process returns to the step S2305. In this case, for example, the record specified in the step S2305 may be excluded by a flag which notifies object exclusion in the record, or updating the usage date and time in the record to the present date and time.

According to the "key information management process" (FIG. 16) described above, the key information management table is managed so that the key information acquired comparatively recently or the key information of which the usage date and time is old but which shows a position close to the current position may remain. Therefore, if the key information corresponding to the AR data specified in the step S2305 remains in the key information management table and the key information has been excluded from the deletion candidate, there is a high possibility that the AR data would be utilized for the AR display using the key information acquired this time or the AR display using the key information which would be acquired in the near future, even if the usage date and time of the AR data is old. Therefore, such AR data is excluded from the deletion candidate from the AR data management table, and is made to remain in the AR management table.

The process returns to the step S2305 after such exclusion process, a record which is the deletion candidate is retrieved and the contents therein are deleted (the step S2305 to the step S2307). Then, the AR data newly acquired is recorded into the empty record prepared in this way (the step S2310 to the step S2311).

On the other hand, even if corresponding key information remains in the key information management table, if the key information has not been excluded from the deletion candidate (step S2308: No), the usage date and time of the key information is relatively old and a position which the key information shows is not relatively close to the current position among those which remain in the key information management table, and the usage date and time is the oldest with respect to the corresponding AR data. Accordingly, the matching processor 113 considers that there is low possibility that the AR data currently recorded in the record specified in the step S2305 will be used this time or the near future, and the matching processor 113 deletes the contents of the record concerned to prepare an empty record (step S2307).

Operations as described above are repeated until all the targeted AR data is recorded (step S2312: No). When all the AR data has been recorded (step S2312: Yes), the matching processor 113 finishes this process and the process returns to the flow of the "AR display process (2)" (FIG. 14).

In the "AR display process (2)", the AR processor 111 applies the AR display using the AR data corresponding to the key information which is acquired in the step S2102. The AR display using acquired AR data is performed by performing the similar operations with the step S1106 to the step S1111 in the "AR display process (1)" (FIG. 8), which has been described in the first embodiment (step S2103).

Then, if a predetermined termination event does not occur (step S2104: No), the AR processor 111 applies the AR display by repeatedly executing the processes after the step S2102. Occurring the termination event (step S2104: Yes) causes this process to finish.

As described above, according to this embodiment, the key information and the AR data which are stored in the information display apparatus 100 are appropriately managed so that the AR display can be performed efficiently, according to a memory resource and processing ability, and/or the like, which can be utilized by the information display apparatus 100. Furthermore, the data transfer amount for providing the AR data from the information provision apparatus 200 to the information display apparatus 100 can be reduced effectively. Therefore, it is possible to reduce traffic load and to prevent the performance fall of the information display apparatus 100, thus it is possible to improve the convenience concerning the use of the AR service.

Specifically, since only the identification information corresponding to the key information is acquired from the information provision apparatus 200 when the key information has been acquired in the information display apparatus 100, AR data with a comparatively large size, such as the reference image, is not transmitted. Then, only when the AR data corresponding to the AR data stored in the information display apparatus 100 is not included based on the acquired identification information, the information display apparatus 100 receives a provision of the AR data from the information provision apparatus 200. Thereby, it is possible to significantly reduce the data transfer amount on the communication network NW, in comparison with the case of acquiring the AR data from the information provision apparatus 200 for each time of acquiring the key information.

Moreover, the key information acquired comparatively recently and the key information which shows the position information close to the current position are stored in the information display apparatus 100 so as to remain preferentially and, the AR data corresponding to these pieces of key information is managed so as not to be deleted. Thus, the AR data with high possibility for being utilized at the present or the latest future is preferentially stored in the information display apparatus 100. Therefore, it is possible to further reduce the number of transaction with the information provision apparatus 200 for acquiring the AR data.

Although the "usage date and time" about the AR data is updated in this embodiment, in a case where the AR data corresponding to the key information acquired at that time has already recorded in the AR data management table (Step S2302 in the "AR data management process" (FIG. 17)), the "usage date and time" may also be updated in a case of using the AR data recorded in the AR data management table for the AR display. Thereby, it is possible to preferentially store the AR data actually used for the AR display in the information display apparatus 100.

Moreover, when the key information is deleted from the key information management table (Step S2208 in the "key information management process" (FIG. 16)), the AR data associated with the key information may be deleted from the AR data management table. Further, when the AR data is deleted from the AR data management table (Step S2307 in the "AR data management process" (FIG. 17)), the key information, with which the identification information of the AR data (the AR data identification information) is associated, may be deleted from the key information management table.

Accordingly, when either key information or AR data is determined as a deletion candidate, the AR data or the key information corresponding thereto is also deleted. Thus, it is possible to improve a possibility that the empty record is prepared in advance in both of the key information management table and the AR data management table.

Third Embodiment

Although, a group ID is exemplified as the key information which is sent from the facility such as the store, and/or the like, in the above-described second embodiment, the AR data (the reference image) can be acquired other than the key information from the facility in the same manner as the acquired group ID. In this case, for example, even if the position information cannot be acquired by GPS, the AR data which is required for use of the AR service can be acquired. In addition, since the AR data can be acquired without accessing the information provision apparatus 200, and/or the like, the traffic load in the communication network NW can be reduced.

In this embodiment, a short range wireless communication device and visible-light-communication device which are installed in the facility such as the store, and/or the like, function as the information provision apparatus 200. Different from the information provision apparatus 200 exemplified in each of above-described embodiments, these devices are only necessary to store and send the information regarding a installation location. Thus, it is possible to realize on a small scale and in simple, and to provide a huge amount of AR data dispersedly.

In each of the above-described embodiments, so-called 2D image such as a photograph image is used as such reference image provided. In this case, unless the image is taken in a direction of line of sight which is identical to a direction of line of sight from the camera by which the reference image is taken, the above matching may not work well. In particular, in the case where AR displays may be applied for a number of products respectively inside a store, and/or the like, if the inside the store is narrow or the subject is near, a photograph cannot necessarily be taken in the same direction of line of sight as that of the reference image. Moreover, the matching operation is performed in the background and a user does not recognize what kind of reference image is used, thus, usually, it is not possible to take a photograph with a direction of line of sight which is set so as to match with that of the reference image.

In a case of the information display apparatus 100 in which the imager 140 is configured by the stereo camera, the information display apparatus 100 can generate 3D modeling data from the captured image. Thus, the information display apparatus 100 attempts to solve the problems described above, by making such 3D modeling data apply the matching with the reference image. This embodiment will explain an example of operation in such case below.

Figure 19:
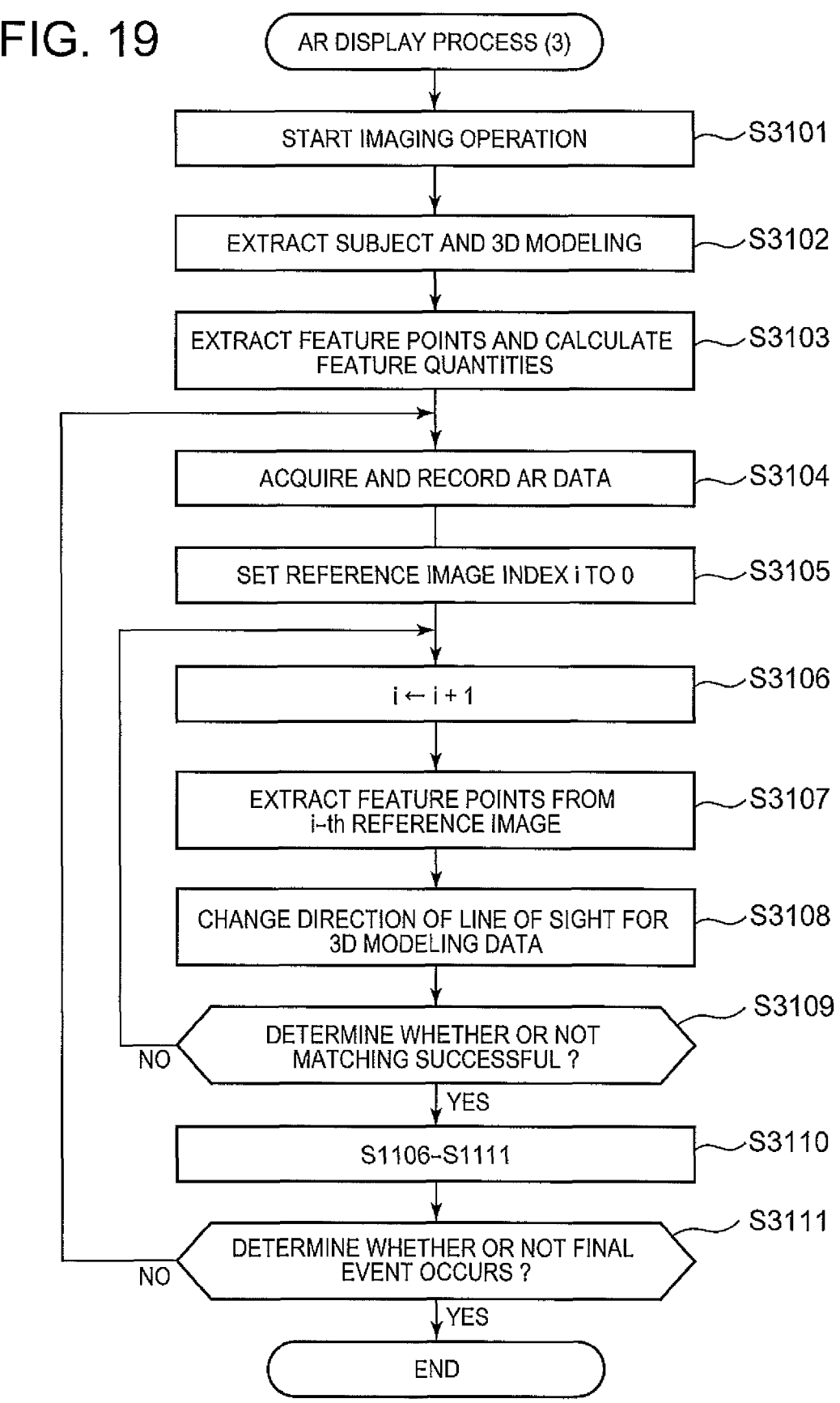
FIG. 19 is a flowchart for explaining a "AR display process (3)" concerning a third embodiment of the present disclosure.

An "AR display process (3)" in which the information display apparatus 100 applies the matching using 3D modeling data will be explained with reference to a flowchart shown in FIG. 19. In this embodiment, the AR data is provided to the information display apparatus 100 by the short range wireless communication device and the visible-light-communication device which are installed in the facility such as the store.

Starting the process, the imaging processor 112 controls the imager 140 which is the stereo camera, and imaging operation is started (step S3101). In this embodiment, for example, the storer 160 includes a storage apparatus on which capture data is decompressed for image processing, such as VRAM (Video RAM). In this case, the matching processor 113 generates 3D modeling data of the extracted subject by extracting the subject from the captured image and performing a depth estimation, to the capture data decompressed on the storer 160 using a known technique in the 3D modeling (step S3102).

When 3D modeling data is generated, the matching processor 113 extracts characteristic points and calculates characteristic amounts, with respect to the subject for which the 3D modeling data is generated from the captured image, using a known technique in the image processing by SIFT (Scale Invariant Feature Transform) or SURF (Speeded Up Robust Features), and/or the like (step S3103).

Moreover, the matching processor 113 controls the key information acquirer 130 or the like to acquire the AR data sent from the short range wireless communication device or the visible-light communications device which are installed in the facility such as the store, and records the AR data on the storer 160 (step S3104). With respect to the record of the AR data, the matching processor 113 records on the AR data management table, and/or the like, as exemplified in the second embodiment.

In a case where two or more reference images are included in acquired AR data, in order to apply the matching between generated 3D modeling data and these reference images one by one, the matching processor 113 sets an index number i of the reference image to be a processing object into an initial value "0" (step S3105), then applies the value of i+1 (step S3106). Thus a first reference image is designated.

With respect to the above mentioned reference image (i-th reference image) stored in the storer 160. The matching processor 113 performs a process similar to that of the step S3103, to thereby extract the characteristic points or calculate the characteristic amounts by SIFT, SURF, and/or the like (step S3107).

Figure 20A:
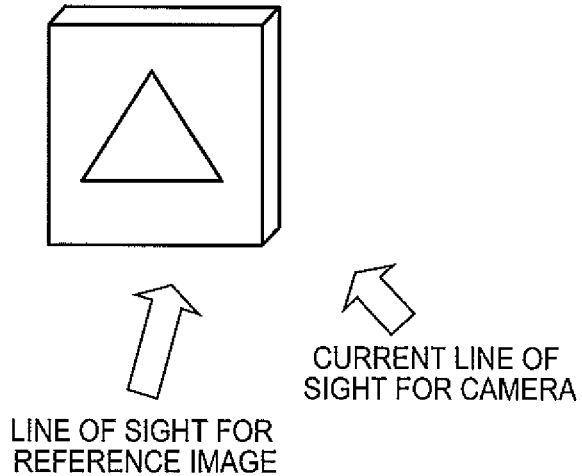
FIGS. 20A to 20D are diagrams for explaining the reference image and 3D modeling data in the "AR display process (3)" shown in FIG. 19, FIG. 20A exemplarily shows a direction of line of sight to a subject.
Figure 20B:
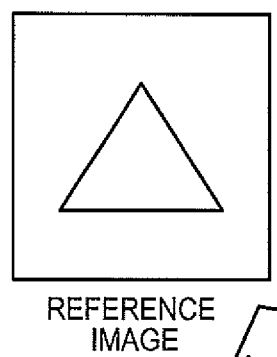
Figure 20C:
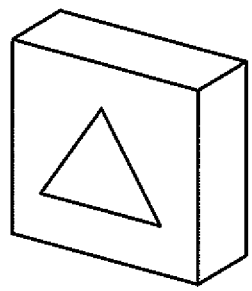

The subject currently captured is a three-dimensional object as shown in FIG. 20A, whereas the prepared reference image is a photograph image (2D image) as shown in FIG. 20B captured from a direction of "line of sight for reference image" in FIG. 20A. When the current imaging direction of the information display apparatus 100 is a direction of "current line of sight from the camera" in FIG. 20A, the 3D modeling data generated in the step S3102 would be one as shown in FIG. 20C.

Figure 20D:
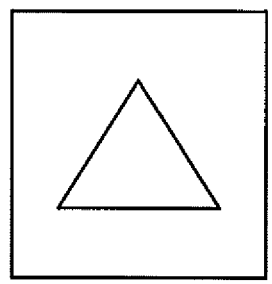

In this case, since the line of sight for the reference image and the line of sight in the current imaging are different, it is not possible to apply the matching using the reference image for the generated 3D modeling data. For this reason, the matching processor 113 compares characteristic points, characteristic amounts of the captured image, and characteristic points, characteristic amounts of the reference image respectively and, changes the direction of line of sight for the 3D modeling data so as to correspond to the direction of line of sight for the reference image (step S3108). The 3D modeling data which is made a line of sight change in this way is similar to the reference image as shown in FIG. 20D. Therefore it is possible to perform the matching using the reference image.

In a case where the reference image compared now does not correspond to the subject for which the 3D modeling data is generated, the matching does not succeed even if the line of sight of the 3D modeling data is changed (step S3109: No). In this case, the process returns to the step S3106 and, the matching processor 113 performs above-described processes with respect to next reference image by making the index number i of the target reference image +1.

In a case where the matching has succeeded (step S3109: Yes), the AR processor 111 applies the AR display (step S3110) by performing the processes similar to the step S1106 to the step S1111 in the "AR display process (1)" (FIG. 8) exemplified in the first embodiment.

Then, if a predetermined termination event which is exemplified in each of the above-described embodiments does not occur (step S3111: No), the process returns to the step S3104, and the matching processor 113 repeatedly performs subsequent processes. If the termination event occurs (step S3111: Yes), the matching processor 113 finishes this process.

According to this embodiment as described above, since the direction of the line of sight for the 3D modeling data generated from the captured image is changed based on the characteristic points and the characteristic amounts which are extracted from the captured image and the reference image, it is possible to appropriately apply the matching even if the captured image is taken from a direction which is different from the direction of line of sight for the reference image and, it is possible to adequately apply the AR display regardless of which direction the captured image is taken from. Specifically, even in a case where the subjects of the AR service according to expansion of the AR service increase, an exact AR display can be applied and a user's convenience can be improved.

Although the reference image as a photograph image is acquired from the short range wireless communication device or the visible-light-communications device, which are installed in the facility such as the store, and/or the like, in this embodiment, the reference image itself which is provided in this way may be 3D modeling data. In the cases where the information provision apparatus 200, exemplified in the first and second embodiments, provide the reference image, the reference image may be similarly 3D modeling data. When the matching is applied to those of 3D modeling data, it is possible to perform more accurate matching operation based on numerical operation, without performing the image processing.

As explained above, according to each of above-mentioned embodiments concerning the present disclosure, it is possible to improve a user's convenience even if the number of objects becomes large, in a case of utilizing the AR service.

The above-mentioned embodiments are examples and, the scope of the present disclosure is not restricted to the embodiments. Specifically, various applications are possible and every possible embodiments are included in the scope of the present disclosure.

The specifications, the format, and/or the like, which are shown in each of the above mentioned embodiments are merely examples, and so long as the same effect is obtained, specifications or format which may be employed is arbitrary.

Moreover, although the smartphone is exemplified as the information display apparatus 100 in each of the above-mentioned embodiments, the information display apparatus 100 is not restricted to the smartphone but arbitrary apparatus can be used as the information display apparatus 100, if the apparatus has at least an imaging function, and a configuration capable of acquiring the key information and/or the AR data.

In the arbitrary apparatus adoptable as the information display apparatus 100, even if the apparatus does not have functions realized by the controller 110 mentioned above, it is possible to cause existing apparatus to function as the information display apparatus concerning the present disclosure if functional configurations as shown in FIG. 4 can be achieved by applying a program.

Similarly, if functional configurations as shown in FIG. 6 can be achieved by applying a program to a general-purpose server device, and/or the like, it is possible to cause existing information processing device, and/or the like, to function as the information provision apparatus concerning the present disclosure.

A method for applying the program to an arbitrary apparatus so as to function as the information display apparatus or the information provision apparatus may be appropriately determined where necessary. For example, the program may be applied to the arbitrary apparatus by storing the program in the storage media such as CD-ROM and a memory card, and may be also applied to the arbitrary apparatus through the communication media, such as the Internet.

Having described and illustrated the principles of this application by reference to one (or more) preferred embodiment(s), the preferred embodiment(s) of the present disclosure may be readily recognized as capable of being modified to various configuration without departing from the principles disclosed herein and being construed as including all such modifications and variations within the spirit and scope of the subject matter disclosed in these embodiments.

What is claimed is:

1. An information display system for displaying information comprising:
    an information display apparatus which includes an imaging unit; and
    an information provision apparatus;
    wherein the information display apparatus comprises:
        a key information acquiring unit which acquires key information corresponding to a subject in a captured image captured by the imaging unit; and
        a key information notifying unit which notifies the key information to the information provision apparatus each time the key information is acquired,
    wherein the information provision apparatus comprises:
        an AR data storage unit which stores augmented reality (AR) data corresponding to identification information for identifying the AR data and key information notified by the key information notifying unit, the AR data including (i) a reference image to be compared with the subject in the captured image captured by the imaging unit, and (ii) superimposing information to be superimposed on the captured image that includes the subject compared with the reference image; and
        an information providing unit (i) which transmits the identification information corresponding to the key information to the information display apparatus, without transmitting the AR data corresponding to the identification information, when the key information is provided from the information display apparatus, and (ii) which transmits the AR data corresponding to the identification information to the information display apparatus when the identification information is provided from the information display apparatus,
    wherein the information display apparatus further comprises:
        an identification information acquiring unit which acquires the identification information provided from the information provision apparatus in accordance with a notification of the key information, without acquiring the AR data corresponding to the identification information;
        a key information recording unit which adds and records new key information and new identification information in a table each time the new identification information is acquired, wherein the table contains first sets each comprising the key information and the identification information in association with each other, wherein the first sets do not include the AR data corresponding to the identification information;

an identification information notifying unit which notifies the identification information recorded in the table to the information provision apparatus;

an AR data acquiring unit which acquires the AR data provided from the information provision apparatus in accordance with a notification of the identification information;

an AR data recording unit which records second sets in the table other than the first sets, the second sets each comprising the identification information notified by the identification information notifying unit and the AR data acquired by the AR data acquiring unit in association with each other; and an AR data displaying unit which superimposes and displays the superimposing information corresponding to the reference image on the captured image based on a result from matching the subject in the captured image with the reference image included in the AR data which is recorded by the AR data recording unit, wherein the identification information notifying unit determines, each time the identification information is acquired, whether the AR data corresponding to the identification information is already recorded in the table, and (i) if the AR data corresponding to the identification information is determined to already be recorded, the identification information notifying unit does not notify the identification information to the information provision apparatus and the AR data acquiring unit does not reacquire the AR data which is already recorded, and (ii) if the AR data is determined to not be recorded, the identification information notifying unit notifies the identification information to the information provision apparatus, the information providing unit of the information provision apparatus transmits the AR data corresponding to the identification information to the information display apparatus in response to the notification of the identification information by the information display apparatus, the AR data acquiring unit of the information display apparatus acquires the AR data transmitted from the information provision apparatus, and the AR data recording unit records the newly acquired AR data in association with the corresponding identification information as a new second set in the table.

2. An information display apparatus comprising:
an imaging unit;
a communication unit which communicates with an external apparatus;
a key information acquiring unit which acquires key information corresponding to a subject in a captured image captured by the imaging unit;
a key information notifying unit which notifies the key information acquired by the key information acquiring unit to the external apparatus through a communication network each time the key information is acquired;
an identification information acquiring unit which acquires identification information for identifying augmented reality (AR) data which is to be transmitted by the external apparatus, the identification information acquiring unit acquiring the identification information without acquiring the AR data corresponding to the identification information, in accordance with a notification of the key information by the key information notifying unit through the communication network, the AR data including (i) a reference image to be compared with the subject in the captured image captured by the imaging unit, and (ii) superimposing information to be superimposed on the captured image that includes the subject compared with the reference image;

a key information recording unit which adds and records new key information and new identification information in a table each time the new identification information is acquired, wherein the table contains first sets each comprising the key information and the identification information in association with each other, wherein the first sets do not include the AR data corresponding to the identification information;

an identification information notifying unit which notifies the identification information recorded in the table to the external apparatus;

an AR data acquiring unit which acquires the AR data transmitted by the external apparatus in accordance with a notification of the identification information;

an AR data recording unit which records second sets in the table other than the first sets, the second sets each comprising the identification information notified by the identification information notifying unit and the AR data acquired by the AR data acquiring unit in association with each other; and an AR data displaying unit which superimposes and displays the superimposing information corresponding to the reference image on the captured image based on a result from matching the subject in the captured image with the reference image included in the AR data which is recorded by the AR data recording unit, wherein the identification information notifying unit determines, each time the identification information is acquired, whether the AR data corresponding to the identification information is already recorded in the table, and (i) if the AR data is determined to already be recorded, the identification information notifying unit does not notify the identification information to the external apparatus and the AR data acquiring unit does not reacquire the AR data which is already recorded, and (ii) if the AR data is determined to not be recorded, the identification information notifying unit notifies the identification information to the external apparatus, the AR data acquiring unit acquires the AR data which is transmitted by the external apparatus in response to the notification of the identification information, and the AR data recording unit records the newly acquired AR data in association with the corresponding identification information as a new second set in the table.

3. The information display device according to claim 2, wherein the table comprises:
a first table in which the first sets each comprising the key information and the identification information in association with each other are recorded by the key information recording unit, and
a second table in which the second sets each comprising the identification information and the AR data in association with each other are recorded by the AR data recording unit.

4. The information display device according to claim 3, wherein:
the first table and the second table are each defined by a number of records,
the identification information notifying unit notifies the identification information to the external apparatus when the identification information recorded in the first table is not recorded in the second table;

the key information recording unit executes a deletion based on a usage date and time of the key information already recorded, when no empty record is present in the first table at a time when the key information acquiring unit acquires the key information, and does not execute a deletion when an empty record is present; and the AR data recording unit executes a deletion based on a usage date and time of the AR data already recorded, when no empty record is present in the second table at the time the identification information notifying unit notifies the identification information, and does not execute a deletion when an empty record is present.

5. The information display apparatus according to claim 4, wherein:

the key information recording unit records a date and time when acquiring the key information as the usage date and time of the key information, and updates the date and time of the key information when superimposing and displaying the superimposing information on the captured image using the AR data corresponding to the key information;

the AR data recording unit records a date and time when acquiring the AR data as the usage date and time of the AR data, and updates the date and time when superimposing and displaying the superimposing information on the captured image using the AR data; and the key information recording unit and the AR data recording unit specify a record recording an oldest date and time as the usage date and time as a deletion target.

6. The information display apparatus according to claim 5, wherein:

the key information includes position information indicating a position of the information display apparatus at a time of imaging by the imaging unit; and the key information recording unit:

(i) calculates a distance between the position indicated by the position information and a current position of the information display apparatus when the key information recorded in the record specified as the deletion target is the position information; and (ii) excludes the record from being the deletion target when the calculated distance is smaller than a predetermined threshold.

7. The information display apparatus according to claim 6, wherein the AR data recording unit excludes the specified record from being the deletion target, when (i) the identification information recorded in the record specified as the deletion target is recorded in the first table, and (ii) the record recording the identification information in the first table has been excluded from being the deletion target by the key information recording unit.

8. An information display method, comprising:

acquiring key information corresponding to a subject in a captured image captured by an imaging unit;

notifying the key information to an external apparatus through a communication network each time the key information is acquired;

acquiring identification information for identifying augmented reality (AR) data which is to be transmitted by the external apparatus, the identification information being acquired without acquiring the AR data corresponding to the identification information, in accordance with a notification of the key information through the communication network, the AR data including (i) a reference image to be compared with the subject in the captured image captured by the imaging unit and (ii) superimposing information to be superimposed on the captured image that includes the subject compared with the reference image;

adding and recording new key information and new identification information in a table each time the new identification information is acquired, wherein the table contains first sets each comprising the key information and the identification information in association with each other, wherein the first sets do not include the AR data corresponding to the identification information;

notifying the identification information recorded in the table to the external apparatus;

acquiring the AR data transmitted by the external apparatus in accordance with a notification of the identification information;

recording second sets in the table other than the first sets, the second sets each comprising the notified identification information and the acquired AR data in association with each other;

superimposing and displaying the superimposing information corresponding to the reference image on the captured image based on a result from matching the subject in the captured image with the reference image included in the AR data which is recorded in the table, wherein each time the identification information is acquired, it is determined whether the AR data corresponding to the identification information is already recorded in the table, and (i) if the AR data is determined to already be recorded, the identification information is not notified to the external apparatus and the AR data which is already recorded is not reacquired, and (ii) if the AR data is determined to not be recorded, the identification information is notified to the external apparatus, the AR data which is transmitted by the external apparatus in response to the notification of the identification information is acquired, and the newly acquired AR data is recorded in association with the corresponding identification information as a new second set in the table.

9. A non-transitory computer-readable storage medium which stores a program for causing a computer of an information display apparatus including an imaging unit, a communicating unit which communicates with an external apparatus, and a displaying unit, to perform functions comprising:

acquiring key information corresponding to a subject in a captured image captured by the imaging unit;

notifying the key information to the external apparatus through a communication network each time the key information is acquired;

acquiring identification information for identifying augmented reality (AR) data which is to be transmitted by the external apparatus, the identification information being acquired without acquiring the AR data corresponding to the identification information, in accordance with a notification of the key information through the communication network, the AR data including (i) a reference image to be compared with the subject in the captured image captured by the imaging unit and (ii) superimposing information to be superimposed on the captured image that includes the subject compared with the reference image;

adding and recording new key information and new identification information in a table each time the new identification information is acquired, wherein the table contains first sets each comprising the key information and the identification information in association with each other, wherein the first sets do not include the AR data corresponding to the identification information;

notifying the identification information recorded in the table to the external apparatus;

acquiring the AR data transmitted by the external apparatus in accordance with a notification of the identification information;

recording second sets in the table other than the first sets, the second sets each comprising the notified identification information and the acquired AR data in association with each other; and superimposing and displaying the superimposing information corresponding to the reference image on the captured image based on a result from matching the subject in the captured image with the reference image included in the AR data which is recorded in the table, wherein each time the identification information is acquired, it is determined whether the AR data corresponding to the identification information is already recorded in the table, and (i) if the AR data is determined to already be recorded, the identification information is not notified to the external apparatus and the AR data which is already recorded is not reacquired, and (ii) if the AR data is determined to not be recorded, the identification information is notified to the external apparatus, the AR data which is transmitted by the external apparatus in response to the notification of the identification information is acquired, and the newly acquired AR data is recorded in association with the corresponding identification information as a new second set in the table.

* * * * *